US010075104B2

(12) United States Patent
Sheldon et al.

(10) Patent No.: US 10,075,104 B2
(45) Date of Patent: Sep. 11, 2018

(54) PLASMONIC NANOSTRUCTURES FOR CONVERSION OF OPTICAL POWER TO ELECTRICAL POWER

(71) Applicant: California Institute of Technology, Pasadena, CA (US)

(72) Inventors: Matthew Sheldon, Los Angeles, CA (US); Harry A. Atwater, S. Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 644 days.

(21) Appl. No.: 13/679,995

(22) Filed: Nov. 16, 2012

(65) Prior Publication Data

US 2013/0133711 A1 May 30, 2013

Related U.S. Application Data

(60) Provisional application No. 61/583,507, filed on Jan. 5, 2012, provisional application No. 61/560,703, filed on Nov. 16, 2011.

(51) Int. Cl.
| H02N 6/00 | (2006.01) |
| H02S 10/00 | (2014.01) |
| B82Y 30/00 | (2011.01) |
| H02S 99/00 | (2014.01) |

(52) U.S. Cl.
CPC ............... *H02N 6/00* (2013.01); *B82Y 30/00* (2013.01); *H02S 99/00* (2013.01)

(58) Field of Classification Search
CPC ............................ B82Y 20/00; H01L 31/0232

USPC .......................................................... 136/243
See application file for complete search history.

(56) References Cited

U.S. PATENT DOCUMENTS

| 4,482,778 A | * | 11/1984 | Anderson | ..................... 136/246 |
| 2008/0291453 A1 | * | 11/2008 | Kaneki | ............... G01N 21/553 |
| | | | | 356/445 |
| 2009/0091762 A1 | * | 4/2009 | Ueno | .................... B22F 1/0018 |
| | | | | 356/445 |
| 2012/0280209 A1 | * | 11/2012 | Bonnell et al. | ................. 257/21 |

FOREIGN PATENT DOCUMENTS

WO    WO 2011056501 A1 *  5/2011

OTHER PUBLICATIONS

Atay, et al., Nano Letters, 2004, vol. 4, No. 9, pp. 1627-1631.*
(Continued)

*Primary Examiner* — Sadie White
(74) *Attorney, Agent, or Firm* — Walter M. Egbert, III; Foley Hoag LLP

(57) ABSTRACT

A plasmoelectric device for conversion of optical power to direct current (DC) electrical power includes a first plasmonic nanostructure having a first resonance value and a second plasmonic nanostructure having a second resonance value. The first and second plasmonic nanostructures are electrically coupled and the first plasmonic nanostructure is configured to receive irradiation at a first irradiation value and the second plasmonic nanostructure is configured to receive irradiation at a second irradiation value, to induce charge transfer between the first and second plasmonic nanostructures.

16 Claims, 30 Drawing Sheets
(29 of 30 Drawing Sheet(s) Filed in Color)

(56) References Cited

OTHER PUBLICATIONS

Atwater, H. A., et al., "Plasmonics for Improved Photovoltaic Devices", *Nature Materials*, vol. 9, Mar. 2010, pp. 205-213 and Corrigendum.
Dondapati, S. K., et al., "Voltage-Induced Adsorbate Damping of Single Gold Nanorod Plasmons in Aqueous Solution", *Nano Letters*, 2012, vol. 12, pp. 1247-1252.
Garcia, G., et al., "Dynamically Modulating the Surface Plasmon Resonance of Doped Semiconductor Nanocrystals", *Nano Letters*, 2011, vol. 11, pp. 4415-4420.
Gordon, J. G., II, et al., "Surface Plasmons as a Probe of the Electrochemical Interface", *Surface Science 101*, 1980, pp. 499-506.
Jain, P. K., et al., "Noble Metals on the Nanoscale: Optical and Photothermal Properties and Some Applications in Imaging, Sensing, Biology, and Medicine", *Accounts of Chemical Research*, Dec. 2008, vol. 41, No. 12, pp. 1578-1586.
Knight, M. W., et al., "Photodetection with Active Optical Antennas", *Science*, May 2011, vol. 332, pp. 702-704.
Luther, J. M., et al., "Localized Surface Plasmon Resonances Arising from Free Carriers in Doped Quantum Dots", *Nature Materials*, vol. 10, May 2011, pp. 361-366.
MacDonald, K. F., et al., "Ultrafast Active Plasmonics", *Nature Photonics*, vol. 3, Jan. 2009, pp. 55-58.
Maier, S. A., et al., "Plasmonics—A Route to Nanoscale Optical Devices", *Advanced Materials*, 2001, vol. 13, pp. 1501-1505.
Marty, R., et al., "Charge Distribution Induced Inside Complex Plasmonic Nanoparticles", *Optics Express*, Feb. 2010, vol. 18, No. 3, pp. 3035-3044.
Odom, T. W., et al., "Introduction to Plasmonics", *Chemical Reviews*, 2011, vol. 111, pp. 3667-3668.
Pillai, S., et al., "Surface Plasmon Enhanced Silicon Solar Cells", *Journal of Applied Physics*, vol. 101, 2007, pp. 093105:1-8.
Polman, A., "Plasmonics Applied", *Science*, Nov. 2008, vol. 322, pp. 868-869.
Rakic, A. D., et al., "Optical Properties of Metallic Films for Vertical-Cavity Optoelectronic Devices", *Applied Optics*, Aug. 1998, vol. 37, No. 22, pp. 5271-5283.
Reinhard, B. M., et al., "Use of Plasmon Coupling to Reveal the Dynamics of DNA Bending and Cleavage by Single EcoRV Restriction Enzymes", *PNAS*, Feb. 2007, vol. 104, No. 8, pp. 2667-2672.
Sheldon, M. T., et al., "The Plasmoelectric Effect: Optically Induced Electrochemical Potentials in Resonant Metallic Structures", *Thomas J. Watson Laboratories of Applied Physics, California Institute of Technology*, Pasadena, CA; Date Unknown, pp. 1-24.
Wang, F., et al., "Power-Independent Wavelength Determination by Hot Carrier Collection in Metal-Insulator-Metal Devices", *Nature Communications*, Apr. 2013, pp. 1-7.
Yu, W. J., et al., "Small Hysteresis Nanocarbon-Based Integrated Circuits on Flexible and Transparent Plastic Substrate", *Nano Letters*, 2011, vol. 11, pp. 1344-1350.
Nelson, Jenny, The Physics of Solar Cells, Imperial College Press, 2003, pp. 1-87, World Scientific Publishing Co. Pte. Ltd., Singapore, 46 pages.
Maier, Stefan A., Plasmonics: Fundamentals and Applications, Springer Science Business Media LLC, 2007, pp. 1-19, New York, 17 pages.
Blatt, Frank J., et al., Thermoelectric Power of Metals, Plenum Press,1976, pp. 1-47, Plenum, New York, 48 pages.

\* cited by examiner

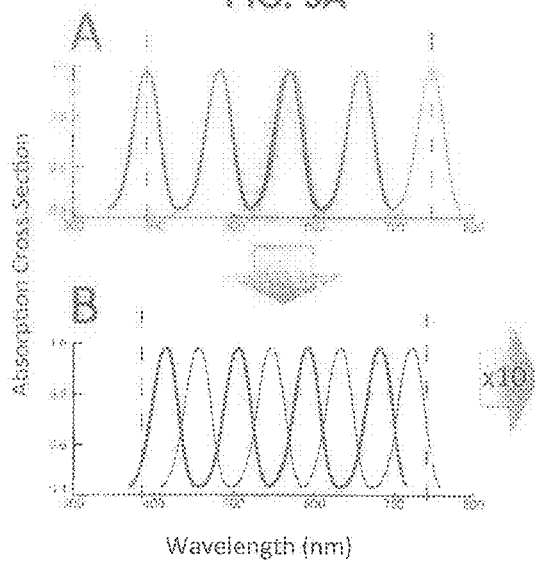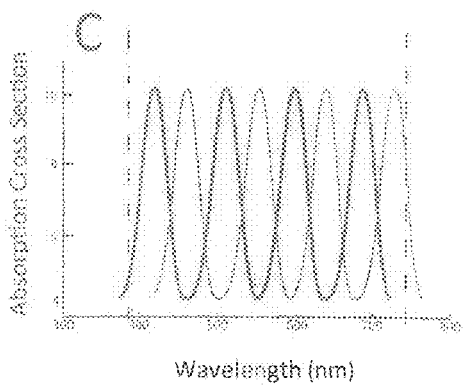
FIG. 3A
FIG. 3B
FIG. 3C

FIG. 10A    FIG. 10B

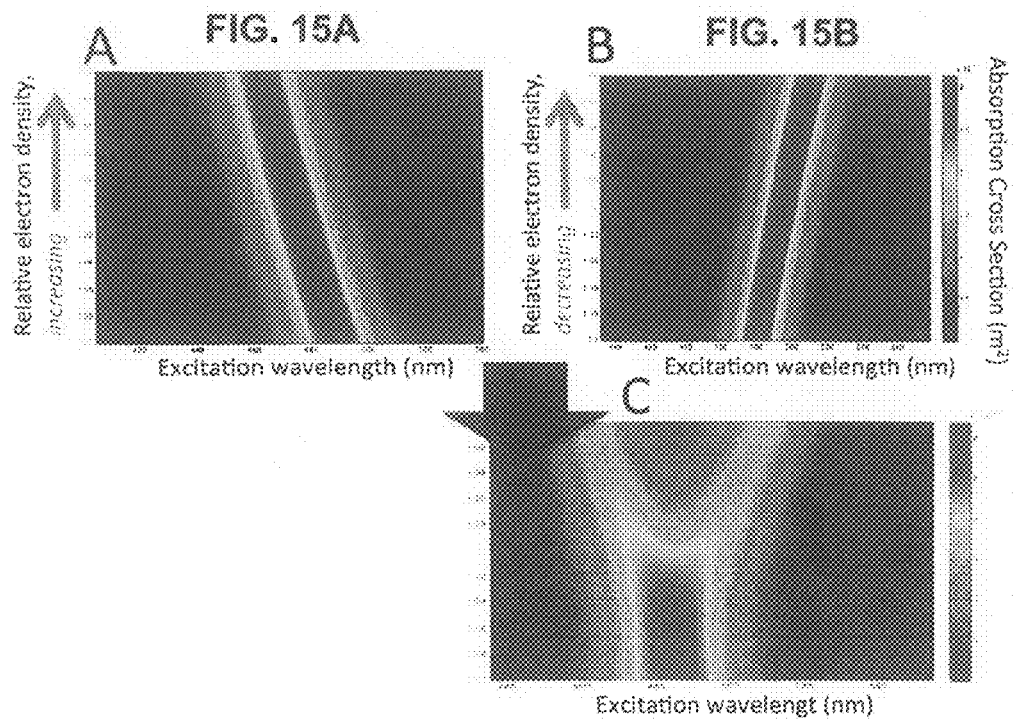
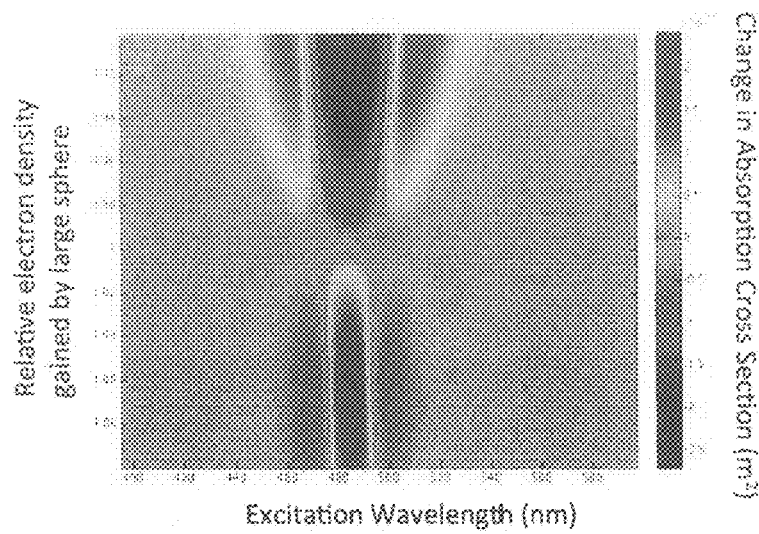
FIG. 15A
FIG. 15B
FIG. 15C
FIG. 15D

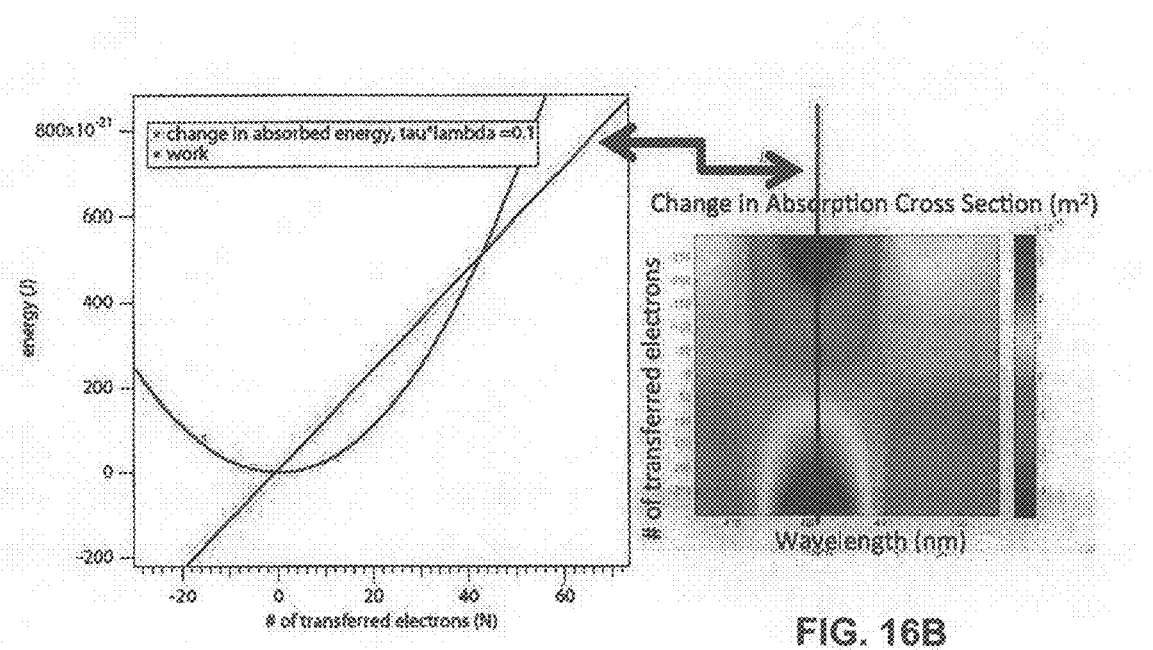
FIG. 16A
FIG. 16B
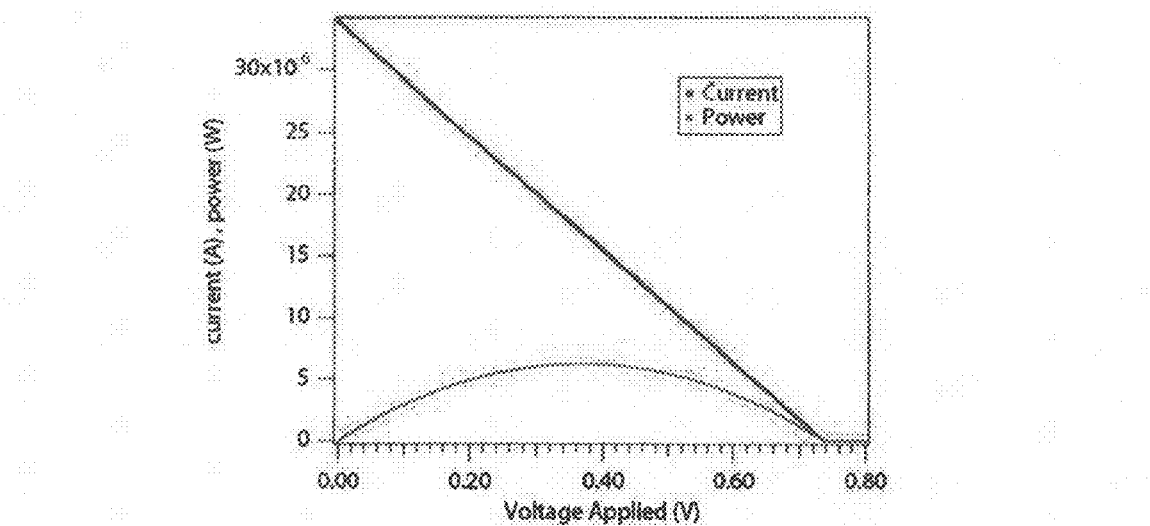
FIG. 16C

PLASMONIC NANOSTRUCTURES FOR CONVERSION OF OPTICAL POWER TO ELECTRICAL POWER

CROSS-REFERENCE TO RELATED APPLICATIONS

This non-provisional application claims priority to and the benefit of U.S. Provisional Application No. 61/560,703, filed Nov. 16, 2011, and U.S. Provisional Application No. 61/583,507, filed Jan. 5, 2012, the entire contents of both of which are incorporated herein by reference.

STATEMENT REGARDING FEDERALLY SPONSORED RESEARCH OR DEVELOPMENT

This invention was made with government support under DE-SC0001293 (T-105355) awarded by the Department of Energy. The government has certain rights in the invention.

FIELD

The present invention relates generally to devices and methods for conversion of optical power into electrical power by plasmonic nanostructures. More particularly, the invention relates to plasmoelectric devices for improved conversion efficiency of optical power to electrical power using resonant optical absorption in plasmonic nanostructures, and to methods of power conversion using resonant optical absorption in plasmonic nanostructures.

BACKGROUND

Plasmonic materials are metals or metal-like materials in which valence electrons are able to move freely. Common plasmonic materials include gold (Au) and silver (Ag). When incident light (e.g., from a light beam) interacts with a plasmonic material, stimulated valence electrons on the surface of the material (sometimes referred to as plasmons or surface plasmons) collectively ripple to create electromagnetic waves on the boundary between the surface of the material and the surrounding medium (e.g., air or water). Resonance occurs when the frequency of photons in the incident light matches the natural frequency of the oscillating surface electrons in the material. The response amplitude of an object or device composed of plasmonic material reaches a maximum at the resonance frequency (or wavelength).

Plasmonic nanostructures are objects or devices of a nanoscale size (e.g., an intermediate size between microscopic- and molecular-sized objects) that are composed of plasmonic material. Plasmonic nanostructures exhibit high internal energy density when irradiated with light. This high internal energy density arises from the coupling of their resonant free electron oscillations to the incident light. Plasmonic nanostructures can also be spectrally tailored. For example, the plasmonic resonance of nanostructures can be tuned from the ultraviolet through the visible and infrared spectrum based on design parameters such as the size, shape and architecture of the plasmonic nanostructures, which influence the excitation and propagation of plasmons. Accordingly, plasmonic nanostructures have been the subject of scientific research relating to various fields and topics, including subwavelength optical confinement, nanoscale photonic circuits, concentration schemes for photovoltaics, field enhancement for Raman spectroscopy, biological labeling techniques, and metamaterials.

Attempts to extract the high energy density of the excited electrons of an irradiated plasmonic nanostructure, for example, to drive an electric current through a circuit load, have exhibited low optical-to-electrical power conversion efficiency. An early approach is detailed in Knight, M. W., Sobhani, H., Nordlander, P., & Halas, N. J., Photodetection with Active Optical Antennas. Science, 332(6030), 702-704. doi:10.1126/science.1203056 (2011), the entire content of which is incorporated herein by reference. In some published examples, the optical-to-electrical power conversion efficiency was less than 1%. This poor power conversion efficiency is due in part to the optical behavior of metals and other plasmonic materials, which are characterized by large free carrier density. One of the primary reasons for the low optical-to-electrical power conversion efficiency is the very short excited state lifetime of electrons in metals and other conductors, which is usually less than 10 fs.

Previous power conversion schemes have generally featured transport of excited electrons over some type of semiconductor-metal interface to rectify the excited electrons in the current. However, such conversion schemes cannot be readily optimized for an appropriate interface barrier height or transit time, because it is challenging to move optically excited electrons through an electrical circuit with sufficient speed and optimal efficiency. For instance, fast electronic relaxation via electron-phonon coupling poses challenges to advancing the efficiency of hot-carrier collection. In addition, challenges arise because the characteristic energy of an optically excited electron in a plasmonic resonance is not known.

SUMMARY

Embodiments of the present invention address the problem of low optical-to-electric power conversion efficiency by taking advantage of a distinctive property of plasmonic nanostructures, namely that charge transport can be induced solely by changes in their internal charge density. This distinctive behavior is described herein as the "plasmoelectric effect." The plasmoelectric effect induces "plasmoelectric potentials" in the nanostructures. According to embodiments of the present invention, irradiation at frequencies other than the resonance frequencies (known as "off-resonant irradiation") of the nanostructures is one approach to inducing charge transfer. Accordingly, a power conversion device may be designed to maximize the plasmoelectric potential difference and current generated between the nanostructures (thereby increasing power conversion efficiency), by using strategic device geometry and an incident radiation profile to influence the internal charge density of the nanostructures.

According to aspects of embodiments of the present invention, a plasmoelectric device for conversion of optical power to direct current (DC) electrical power has multiple parameters that can be varied so as to produce a plasmoelectric potential and generate current for use by an external circuit. Embodiments of the present invention relate to different permutations of the various parameters, each of which will create a change, or delta, in the internal charge densities of the nanostructures for the purpose of producing a plasmoelectric potential and generating a current.

In embodiments of the present invention, such parameters may include similarities or differences between electrically coupled nanostructures, such as the size of nanostructures (e.g., radius or diameter), the arrangement of the nanostructures (e.g., a plurality of arrays of electrically coupled nanostructures), and the type of nanostructures (e.g., which plasmonic materials are used). Such parameters may also relate to the incident irradiation profile, such as the frequency and intensity of the incident light. For example, different incident frequencies may be used for each nanostructure in a device, or the same frequency may be used for all nanostructures in a device. The incident frequencies may be resonant frequencies or off-resonant frequencies.

Because charge transport (and thus plasmoelectric potential and current generation) depends primarily on the internal charge densities of the electrically coupled nanostructures, no additional semiconductor or insulating components are needed to rectify the excited electrons and perform power conversion. When semiconductor or insulating components are used in typical power conversion schemes, the high energy density of the optically excited electrons cannot be fully harnessed because of electronic relaxation that occurs when excited electrons couple to phonons in the metal and relax before they can exit the plasmonic nanostructure to perform work on circuit load.

Accordingly, in embodiments according to the present invention, an all-metal, or all-conductor, circuit without semiconductor or insulating components may be employed to convert optical power to electric power. Thus, the power conversion efficiency of a plasmoelectric device is not limited by the short excited state lifetime of optically excited electrons.

In embodiments of the present invention, a plasmoelectric device for conversion of optical power to DC electrical power includes first and second electrically coupled plasmonic nanostructures, each having a respective resonance value. The first plasmonic nanostructure is configured to receive irradiation at a first irradiation value and the second plasmonic nanostructure is configured to receive irradiation at a second irradiation value, to induce charge transfer between the first and second plasmonic nanostructures.

In one embodiment, a plasmoelectric device for broadband power conversion includes a first array of electrically coupled plasmonic nanostructures, a second array of electrically coupled plasmonic nanostructures, and an optical structure configured to direct, transmit or send incident broadband radiation to each array. The first and second arrays are electrically coupled, and absorption maxima for the plasmonic nanostructures of the first and second arrays span an incident radiation spectrum.

According to another embodiment, a method of converting optical power to DC electrical power includes providing electrically coupled first and second plasmonic nanostructures. The first plasmonic nanostructure has a first resonance value and the second plasmonic nanostructure has a second resonance value. The first and second plasmonic nanostructures receive irradiation to induce charge transfer between the first and second plasmonic nanostructures. The charge transfer produces a plasmoelectric potential and generates a current between the first and second plasmonic nanostructures.

In another embodiment, an all-conductor (or all-metal) power conversion device includes a first plasmonic nanostructure having a first internal charge density and a second plasmonic nanostructure having a second internal charge density. The first and second plasmonic nanostructures are electrically coupled and are configured to receive irradiation to change the first and second internal charge densities.

In another embodiment, a plasmoelectric device for conversion of optical power to DC electrical power includes a first plasmonic nanostructure having one internal charge density, and at least another internal charge density when exposed to irradiation, and a second plasmonic nanostructure having one internal charge density, and at least another internal charge density when exposed to irradiation. The first and second plasmonic nanostructures are electrically coupled and at least one of the plasmonic nanostructures is configured to receive irradiation to alter from the one internal charge density to the at least another internal charge density.

In another embodiment, a plasmoelectric device for conversion of optical power to DC electrical power includes a voltage source and a current source connected in series. The voltage source includes an anode and a cathode. The anode is a first plasmonic nanostructure and the cathode is a second plasmonic nanostructure electrically coupled to the first plasmonic nanostructure. The current source includes the first and second plasmonic nanostructures and a conduction element configured to electrically couple the first and second plasmonic nanostructures.

A plasmoelectric device for conversion of optical power to DC electrical power includes a first plasmonic nanostructure having a first resonance value, a second plasmonic nanostructure having a second resonance value, a conduction element adapted to electrically couple the first and second plasmonic nanostructures, and at least one optical structure configured to transmit irradiation to the first plasmonic nanostructure at a first irradiation value and transmit irradiation to the second plasmonic nanostructure at a second irradiation value. The first and second plasmonic nanostructures are adapted to transfer charge via the conduction element when irradiated.

BRIEF DESCRIPTION OF THE DRAWINGS

These and other features and advantages of the present invention will be better understood by reference to the following detailed description when considered in conjunction with the accompanying drawings, briefly described below.

The patent or application file contains at least one drawing executed in color. Copies of this patent or patent application publication with color drawing(s) will be provided by the Office upon request and payment of the necessary fee.

FIG. 3A is an absorption cross section plot depicting ideal absorption spectra of uncoupled nanostructures.

FIG. 3B is an absorption cross section plot depicting increases in the absorption spectrum for coupled nanostructures.

FIG. 3C is an absorption cross section plot depicting shifts in the absorption maxima and an increase in the magnitude of absorption for coupled nanostructures.

FIG. 8b is a generally equivalent circuit for the device of FIG. 8a.

FIG. 8c is a plot of the current-voltage response of the device of FIG. 8a.

FIG. 10A is an illustration of an electrochemical cell in which the particle surface charge density of an Au nanoparticle is tuned according to a voltage.

FIG. 10B is a scattering intensity plot showing shifts in plasmon resonance with changes in voltage and charge density.

FIG. 15A depicts an EDDACS for an individual 20 nm radius Ag sphere.

FIG. 15B depicts an EDDACS for an individual 25 nm radius Ag sphere.

FIG. 15C depicts a total EDDACS of a two-particle system including an electrically coupled pair of 20 nm and 25 nm radii Ag spheres.

FIG. 15D is the same plot as FIG. 15C, minus the absorption of the system at a neutral charge configuration.

FIG. 16A is an energy diagram for a 20 nm and 23 nm radii Ag particle couple irradiated at a wavelength of 485 nm.

FIG. 16B depicts the change in absorption cross section of the Ag particle couple whose energy diagram is shown in FIG. 16A.

FIG. 16C is a plot of the current-voltage response corresponding to the energy diagram of FIG. 16A.

FIG. 18b is a plot of the absolute excitation of the 60 nm diameter Au colloid being probed in FIG. 18a.

FIG. 18c is a plot of the absorption increase exhibited by the 60 nm diameter Au colloid being probed FIG. 18a.

DETAILED DESCRIPTION

Figure 1:
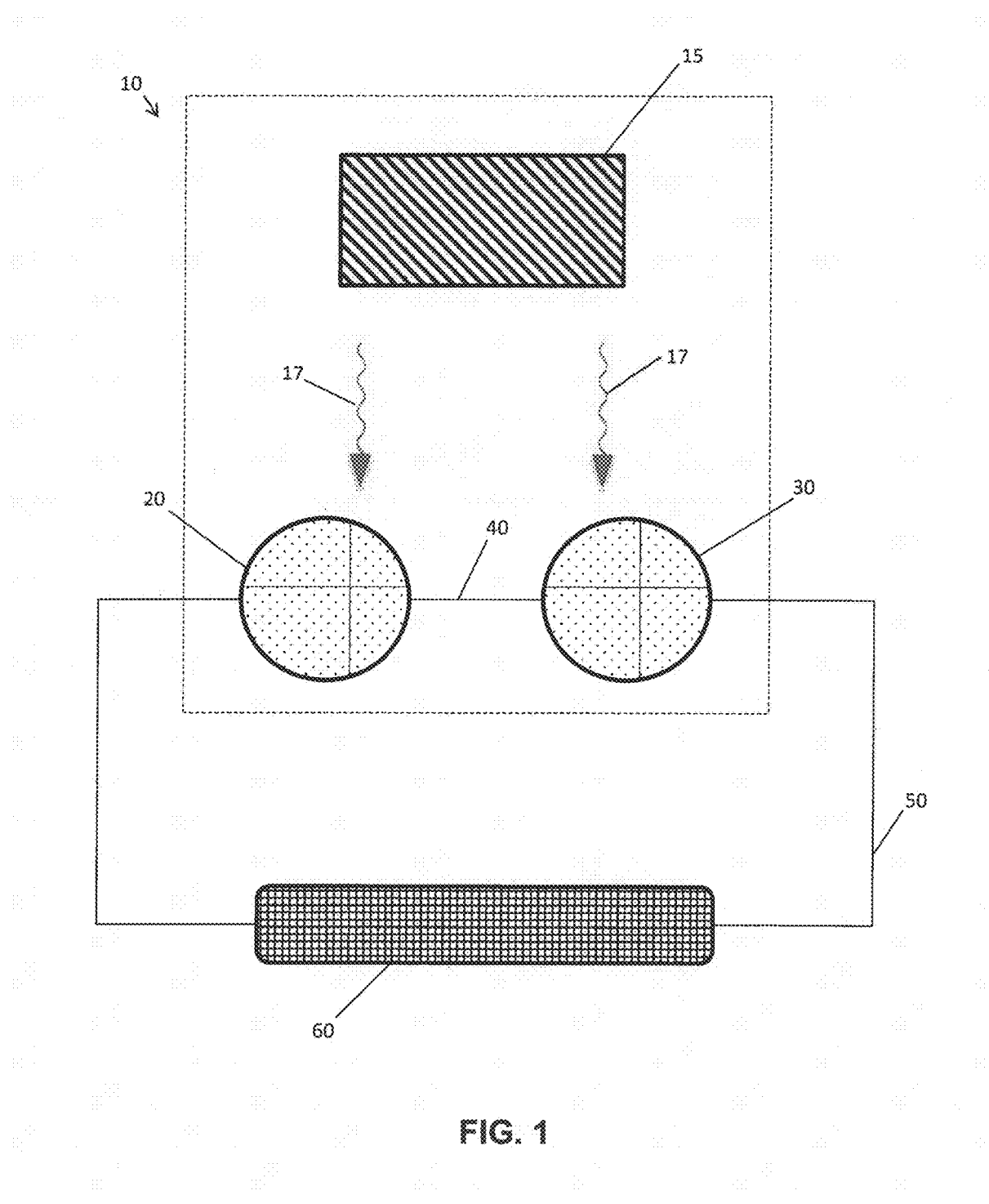
FIG. 1 is a device schematic of a plasmoelectric device for conversion of optical power to DC electrical power according to an embodiment of the present invention.

Optically excited plasmonic nanostructures exhibit power density in the form of coherent oscillations of free electrons that ultimately decay as heat. The high internal energy density of optically excited plasmonic nanostructures results from the coupling of resonant free electron oscillations with incident radiation (e.g., incident light) at the structural resonance frequency. As an example, strong polarization occurs during irradiation of plasmonic nanostructures by laser excitation, which can induce fluctuations of ±10,000% or greater during each optical cycle.

Resonant absorption induces electronic excitation that ultimately leads to significant internal heating (or highly localized heating). According to one embodiment, a steady-state temperature increase of 100 K occurs for resonant irradiation of 10 nm radius Ag spheres at a power density (or irradiation intensity) of 1 kW m$^{-2}$. To date, this source of power has not been efficiently harnessed to perform electrical work. For example, plasmonic resonators that emit optically excited hot electrons across a rectifier (e.g., a semiconductor or insulator barrier) into a circuit have received attention as an energy generation mechanism, but have low efficiency.

Embodiments of the present invention are directed to plasmoelectric devices for improved conversion efficiency of optical power to electrical power using resonant optical absorption in plasmonic nanostructures, and to methods of power conversion using resonant optical absorption in plasmonic nanostructures.

Throughout this disclosure, the terms "nanostructures," "nanoparticles," "particles," and "resonators," are used interchangeably. The term "irradiate" is used to mean that an object is receiving or is exposed to irradiation. Thus, when a nanostructure is described as being "irradiated" at or with a certain wavelength or frequency, the nanostructure is receiving or is exposed to irradiation with that wavelength or frequency. In addition, the terms "plasmonic resonance" or "plasmon resonance" are used to refer to the wavelength or frequency value at which a nanostructure achieves maximum absorption. The symbol e$^-$ as shown in the drawings is used to denote the transfer of electrons and the transfer of charge generally. Further, when a nanostructure is described as being "neutral," the nanostructure may be in a state of equilibrium undisturbed by irradiation, or the nanostructure may be neutral during irradiation, if the incident radiation frequency is exactly resonant with the nanostructure.

Aspects of embodiments of the present invention provide an approach for generation of DC electrical power from resonant optical absorption in plasmonic nanostructures. This approach takes advantage of the plasmoelectric effect. Aspects of embodiments of the present invention also provide a physical model of the optical conditions and device structure used to convert optical power to DC electrical power in an all-conductor circuit. According to the plasmoelectric effect, power conversion results from the dependence of optically generated heat on shifts of the plasmon resonance frequency associated with changes of charge density. Rather than separation of electron-hole pairs, plasmoelectric power conversion exploits the dependence of the plasmon resonance frequency, $\omega_p$, on electron density, n.

A plasmoelectric device for conversion of optical power to DC electrical power includes first and second electrically coupled plasmonic nanostructures, each having a respective resonance value. The first plasmonic nanostructure is configured to receive irradiation at a first irradiation value and the second plasmonic nanostructure is configured to receive irradiation at a second irradiation value, to induce charge transfer between the first and second plasmonic nanostructures.

FIG. 1 is a device schematic of a plasmoelectric device according to an embodiment of the present invention. As shown in FIG. 1, the plasmoelectric device 10 includes a first plasmonic nanostructure 20 and a second plasmonic nanostructure 30. The first and second plasmonic nanostructures 20 and 30 are electrically coupled via a first conduction element 40.

Incident light may originate from any optical source, such as the sun or a device that emits light (e.g., a laser). An optical structure 15 may be included in the plasmoelectric device 10 to direct, transmit or send irradiation to the first and second plasmonic nanostructures 20 and 30. In some embodiments, the optical structure 15 is configured to direct, transmit or send incident light 17 of various frequencies and wavelengths to the first and second plasmonic nanostructures 20 and 30. In an exemplary embodiment, the radiation profile incident on the plasmoelectric device 10 is optimized via one or more optical structures 15, such that only the appropriate frequencies from the incident light source (e.g., the sun or a laser) are incident on the first and second plasmonic nanostructures 20 and 30.

The first plasmonic nanostructure 20 and the second plasmonic nanostructure 30 may be composed of plasmonic materials such as Ag or Au. In addition, the first plasmonic nanostructure 20 and the second plasmonic nanostructure 30 may have a nanoscale size. For example, in one embodiment, the first plasmonic nanostructure 20 and the second plasmonic nanostructure 30 are 10 nm radius Ag spheres. However, the present invention is not limited thereto, and objects of any suitable size or shape composed of plasmonic material may be used.

Further, the first plasmonic nanostructure 20 may have a different structure than the second plasmonic nanostructure 30. For instance, the first plasmonic nanostructure 20 and the second plasmonic nanostructure 30 may be different sizes (e.g., spheres having different radii) or may be composed of different materials. In some embodiments, the first plasmonic nanostructure 20 and the second plasmonic nanostructure 30 are surrounded by a dielectric material. The first plasmonic nanostructure 20 may be surrounded by a different dielectric material than the second plasmonic nanostructure 30, or may be surrounded by the same dielectric material. Either one or both of the first plasmonic nanostructure 20 and the second plasmonic nanostructure 30 may be an array. Other embodiments of the first plasmonic nanostructure 20 and the second plasmonic nanostructure 30 are shown in FIGS. 27A through 27D.

Conduction element 40 may be any element or component suitable for conducting charge, such as a wire. In embodiments according to the present invention, the plasmoelectric device 10 and circuitry 60 are electrically coupled via a second conduction element 50 (e.g., a wire). Circuitry 60 may be any circuit that uses DC electrical power to perform electrical work, and may include any number or combination(s) of electrical components such as resistors, capacitors, inductors, transistors, diodes, integrated circuit chips, and the like. Circuitry 60 may also be a circuit for storing the DC electrical power generated by the plasmoelectric device 10.

A plasmoelectric device for broadband power conversion according to another embodiment of the present invention includes a first array of electrically coupled plasmonic nanostructures, a second array of electrically coupled plasmonic nanostructures, and an optical structure configured to direct, transmit or send incident broadband radiation to each array. The first and second arrays are electrically coupled, and absorption maxima for the plasmonic nanostructures of the first and second arrays span an incident radiation spectrum.

Figure 2:
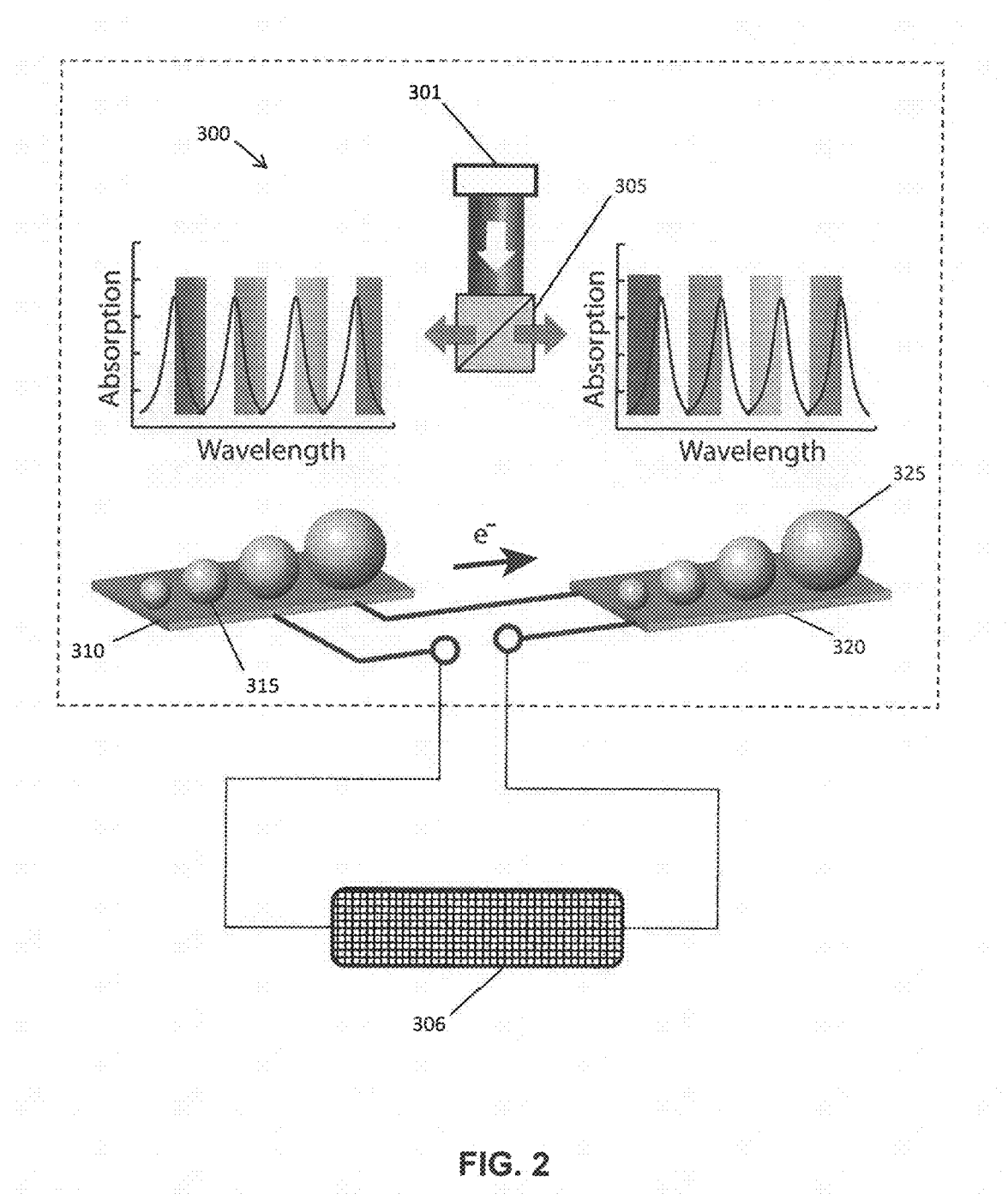
FIG. 2 is a device schematic of a plasmoelectric device for broadband power conversion according to other embodiments of the present invention.

FIG. 2 depicts a plasmoelectric device 300 for broadband power conversion according to an embodiment of the present invention. In one embodiment, the plasmoelectric device 300 includes identical first and second resonator arrays 310 and 320. The first resonator array 310 includes electrically coupled plasmonic nanostructures 315 and the second resonator array 320 includes electrically coupled plasmonic nanostructures 325. The absorption maxima for several neutral particle plasmonic nanostructures of each array span the incident radiation spectrum. In the illustrated embodiment of FIG. 2, the electrically coupled plasmonic nanostructures 315 of the first resonator array 310 have different radii or sizes from one another, and the electrically coupled plasmonic nanostructures 325 of the second resonator array 320 also have different radii or sizes from one another.

An optical structure 305 directs, transmits, or sends incident broadband radiation from an optical light source 301 to the first resonator array 310 and the second resonator array 320 with a radiation profile optimized to maximize the plasmoelectric potential across the entire plasmoelectric device 300. In one embodiment, the optical structure 305 is an optical splitting element such as a diffractive filter. Each resonator in the array receives a band (e.g., a small band) of radiation that either induces a negative plasmoelectric potential or a positive plasmoelectric potential, to maximize the total voltage across the device. The plasmoelectric device 300 may be electrically coupled to any external circuitry 306 that utilizes DC electrical power or an electrical signal that is characteristic of the incident spectrum.

However, embodiments of the present invention are not limited to the configuration shown in FIG. 2. For example, a plasmoelectric device for broadband power conversion may include more than two arrays, and each array may include fewer or greater than four plasmonic nanostructures. Further, the electrically coupled plasmonic nanostructures 315 and 325 may be composed of different plasmonic materials. Any number of different plasmonic nanostructures may be electrically coupled in an array so that absorption maxima for several of the neutral particle plasmonic nanostructures of the coupled arrays span the incident radiation spectrum.

According to another embodiment of the present invention, a method of converting optical power to DC electrical power includes providing electrically coupled first and second plasmonic nanostructures. The first plasmonic nanostructure has a first resonance value and the second plasmonic nanostructure has a second resonance value. The first and second plasmonic nanostructures receive irradiation to induce charge transfer between the first and second plasmonic nanostructures. The charge transfer produces a plasmoelectric potential and generates a current between the first and second plasmonic nanostructures.

FIGS. 3A through 3C illustrate the spectral optimization of a plasmoelectric device for broadband power conversion according to an embodiment. Conversion efficiency may be maximized with the largest "usable" absorption bandwidth. Ideal absorption spectra of uncoupled nanostructures are shown in FIG. 3A. The uncoupled nanostructures exhibit several closely spaced overlapping peaks, except at the edge of the "usable" absorption bandwidth (indicated by the dashed lines). These spectral characteristics allow small transfers of electron density to cause large increases in the coupled absorption spectrum, which is shown in FIG. 3B. As shown in FIG. 3B, more, closer and sharper peaks improve efficiency.

According to an embodiment, efficiency may be further enhanced if shifts in the absorption maxima are also accompanied by an increase in the magnitude of absorption, as in FIG. 3C. This may be achieved by adsorbing dyes on the nanostructures that absorb radiation only at the shifted peaks, for example.

Referring again to FIG. 1, in a method according to one embodiment of the present invention, two electrically coupled plasmonic nanostructures 20 and 30 are provided, which have different structures so that they exhibit absorption maxima at distinct frequencies. For example, the first plasmonic nanostructure 20 and the second plasmonic nanostructure 30 may be different sizes (e.g., spheres having different radii) or may be composed of different materials. In some embodiments, the first plasmonic nanostructure 20 may be surrounded by a different dielectric material than the second plasmonic nanostructure 30. Therefore, according to an embodiment the first resonance value of the first plasmonic nanostructure 20 is different from the second resonance value of the second plasmonic nanostructure 30.

In one embodiment, the first plasmonic nanostructure 20 (having the first resonance value different from the second resonance value of the second plasmonic nanostructure 30) and the second plasmonic nanostructure 30 are both irradiated at an irradiation value between the first resonance value and the second resonance value. The irradiation promotes charge transfer from the higher frequency plasmonic nanostructure to the lower frequency plasmonic nanostructure. Thus, if the first resonance value is greater than the second resonance value, the charge transfer is from the first plasmonic nanostructure to the second plasmonic nanostructure.

An example of this scenario is depicted in FIGS. 4A, 4B, and 5A-5C. In the depicted example, the first plasmonic nanostructure 210 is a 10 nm radius Ag sphere and the second plasmonic nanostructure 220 is a 20 nm radius Ag sphere. The first resonance value of the first plasmonic nanostructure 210 is at a higher frequency than the second resonance value of the second plasmonic nanostructure 220. The first and second plasmonic nanostructures are electrically coupled via a conduction element 212. The first plasmonic nanostructure 210 and the second plasmonic nanostructure 220 are exposed to or receive irradiation 211 with an irradiation value of 550 nm, which is between the first resonance value and the second resonance value, to induce charge transfer e⁻ (or transfer of electrons) from the first plasmonic nanostructure 210 having a higher resonance frequency to the second plasmonic nanostructure 220.

As a result of the charge transfer, the first plasmonic nanostructure 210 decreases in electron density and the second plasmonic nanostructure 220 increases in electron density. This produces a plasmoelectric potential difference between the first and second plasmonic nanostructures. A current is also generated due to the movement of charge from the first plasmonic nanostructure 210 to the second plasmonic nanostructure 220. The charge transfer also causes a spectral shift as shown in FIG. 4B, such that the difference between the resonance values of the plasmonic nanostructures decreases (i.e., the plasmon resonances shift closer together).

Figure 5A:
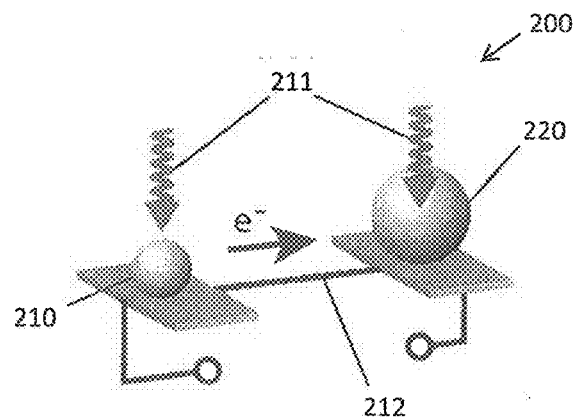
FIG. 5A is a device schematic of two electrically coupled metallic nanostructures having different structures according to an embodiment of the present invention.
Figure 5B:
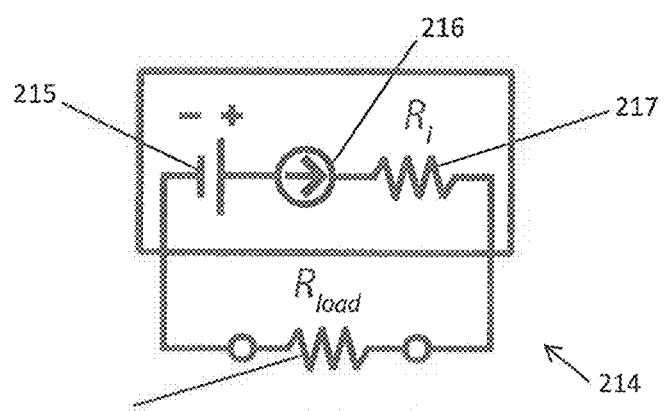
FIG. 5B is a generally equivalent circuit for the device shown in FIG. 5A.
Figure 6:
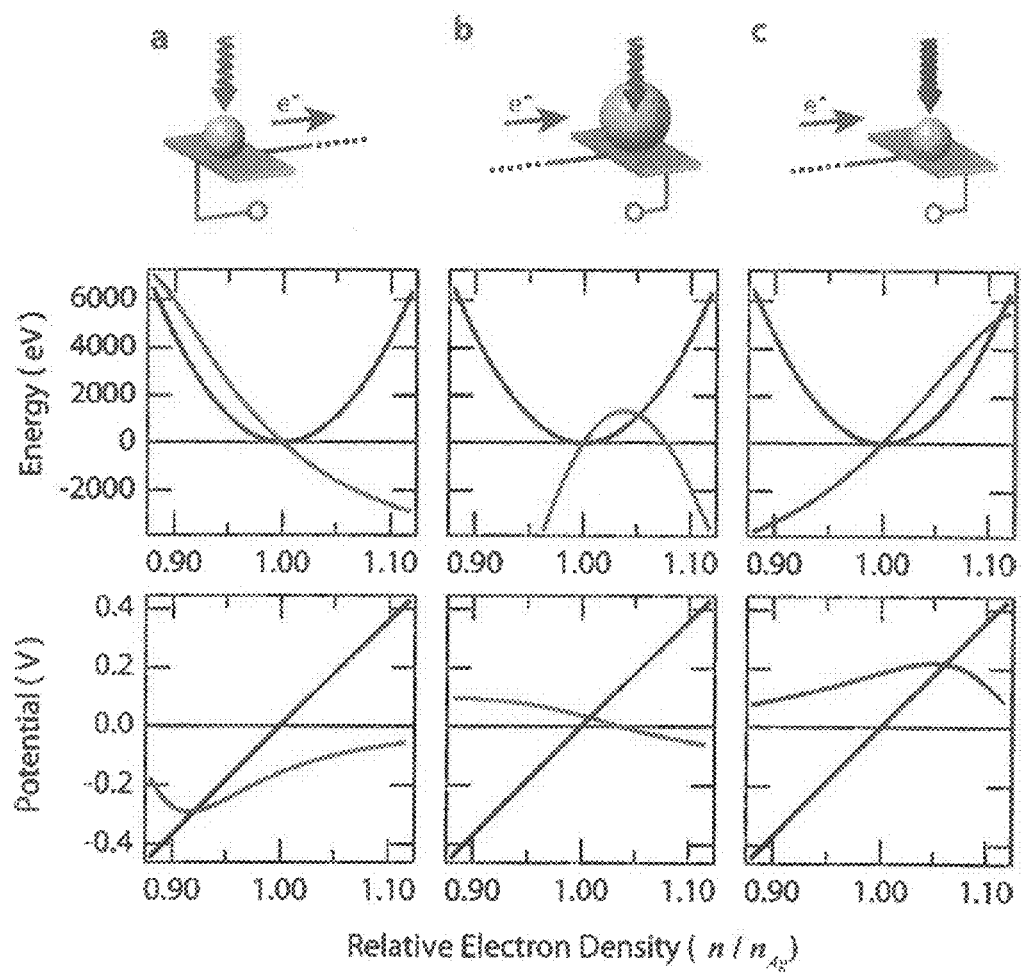
FIG. 6 depicts a thermodynamic analysis of possible device configurations according to embodiments of the present invention.

A thermodynamic analysis of the optical responses of individual nanostructures in such a device geometry is displayed in columns (a) and (b) of FIG. 6. FIG. 5B is a generally equivalent circuit for the plasmoelectric device shown in FIGS. 4A and 5A. The plasmoelectric device 200 of FIG. 5A is represented as a voltage source 215 having an anode and a cathode (or a positive terminal and a negative terminal) connected in series with a current source 216 and an internal resistance $R_i$. The plasmoelectric device 200 is represented as a voltage source 215 because of the plasmoelectric potential difference produced between the first and second nanostructures 210 and 220 as a result of the charge transfer. The plasmoelectric device 200 is represented as a current source 216 because the charge transfer through the conduction element 212 generates a current between the first and second nanostructures 210 and 220. The internal resistance $R_i$ may represent the internal resistance of the conduction element 212 (such as a wire) between the first and second nanostructures 210 and 220. The open circuit 214 may be electrically coupled to external circuitry 218, which is depicted in FIG. 5B as a resistive load $R_{load}$.

Figure 4A:
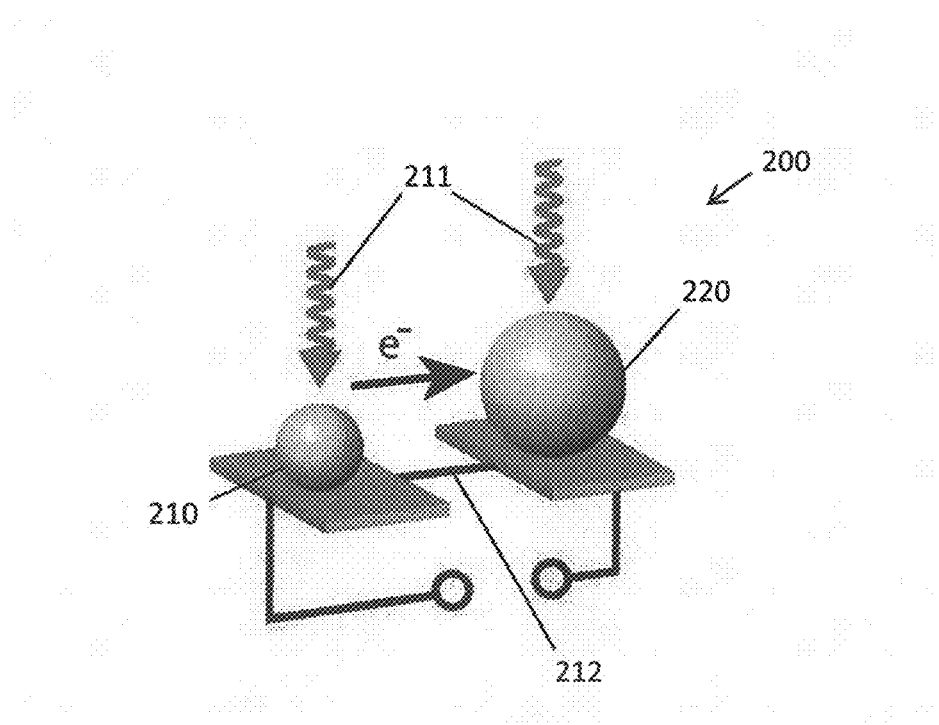
FIG. 4A is a device schematic of two electrically coupled metallic nanostructures having different structures according to an embodiment of the present invention.
Figure 4B:
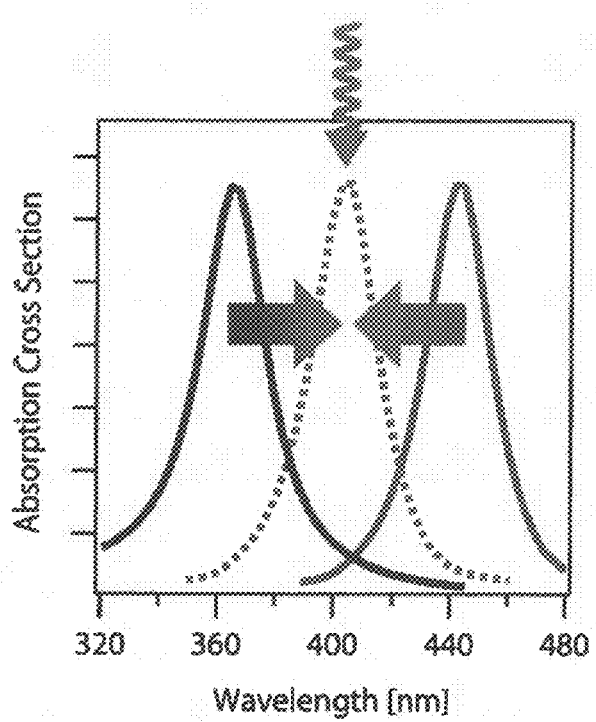
FIG. 4B is an absorption cross section plot depicting the plasmoelectric effect according to an embodiment of the present invention.
Figure 5C:
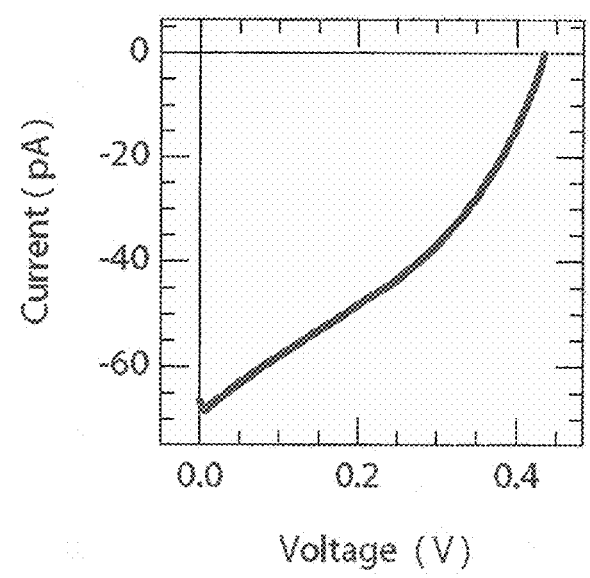
FIG. 5C is a plot of the current-voltage response of the device of FIG. 5A.

FIG. 5C is a plot of the current-voltage response of the plasmoelectric device shown in FIGS. 4A and 5A. According to an embodiment, as shown in FIG. 5C, the induced charge transfer e⁻ produces an open circuit 214 with voltage $V_{OC}$=436 mV and generates a short circuit current $I_{SC}$=68 pA. The maximum optical power conversion efficiency of 15.6% corresponds to a voltage of $V_{load}$=242 mV.

Referring back to FIG. 1, in another embodiment, the first plasmonic nanostructure 20 (having the first resonance value different from the second resonance value of the second plasmonic nanostructure 30) and the second plasmonic nanostructure 30 are irradiated at an irradiation value other than the first and second resonance values. For example, the first plasmonic nanostructure 20 may receive irradiation with a wavelength predominantly outside (or different from) the maximum absorption wavelengths for the neutral particles (e.g., outside a range defined by the first and second resonance values), and the second plasmonic nanostructure 30 may receive irradiation with a different wavelength that is also predominantly outside (or different from) the maximum absorption wavelengths for the neutral particles (e.g., outside a range defined by the first and second resonance values). The irradiation promotes charge transfer from the low frequency plasmonic nanostructure to the high frequency plasmonic nanostructure, in the opposite direction from the embodiment described above.

Figure 7:
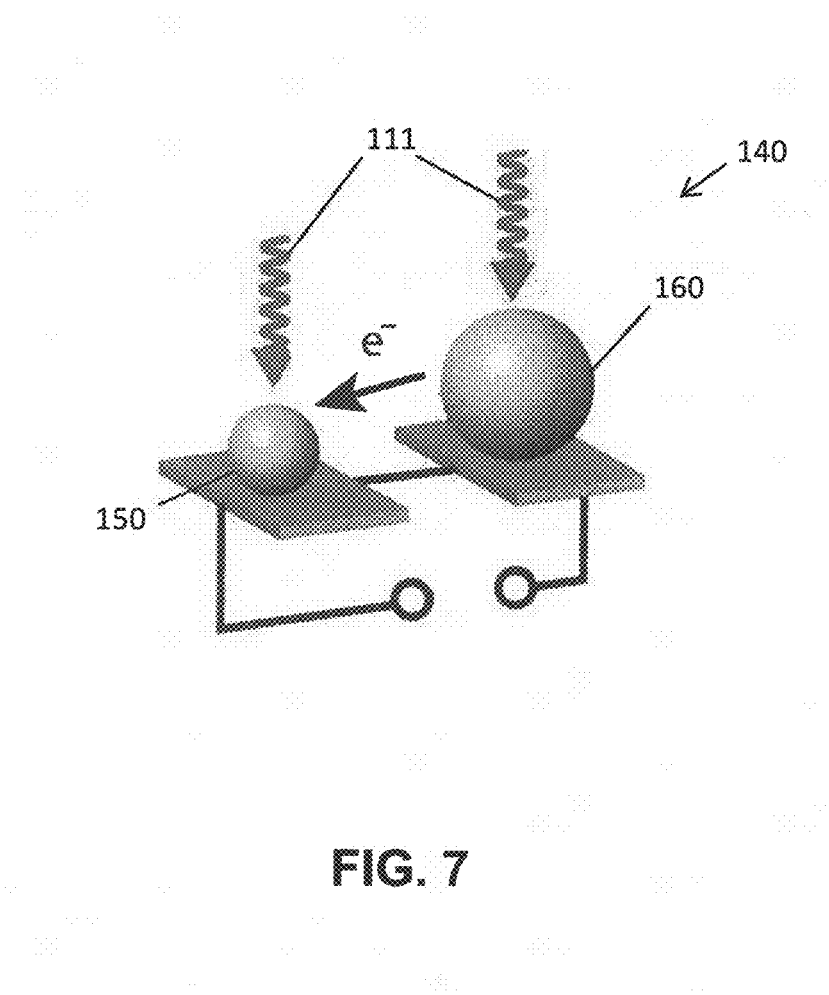
FIG. 7 is a device schematic of two electrically coupled metallic nanostructures having different structures according to another embodiment of the present invention.

An example of this scenario is depicted in FIG. 7. In the depicted example, the geometry of the plasmonic device 140 is identical to the geometry of the plasmoelectric device 200 in FIG. 4A. That is, the first plasmonic nanostructure 150 is a 10 nm radius Ag sphere and the second plasmonic nanostructure 160 is a 20 nm radius Ag sphere. The first resonance value of the first plasmonic nanostructure 150 is at a higher frequency than the second resonance value of the second plasmonic nanostructure 160. The first plasmonic nanostructure 150 and the second plasmonic nanostructure 160 are exposed to irradiation 111 with an irradiation value that is predominantly outside (or different from) the first and second resonance values, to induce charge transfer e⁻ (or transfer of electrons) from the second plasmonic nanostructure 160 to the first plasmonic nanostructure 150. Thus, the direction of movement of charge is in the opposite direction from the embodiment described above with respect to FIGS. 4A, 4B, and 5A-5C.

As a result of the charge transfer, the first plasmonic nanostructure 150 increases in electron density and the second plasmonic nanostructure 160 decreases in electron density. This produces a plasmoelectric potential difference between the first and second plasmonic nanostructures. A current is also generated due to the movement of charge from the second plasmonic nanostructure 160 to the first plasmonic nanostructure 150. Further, unlike the embodiment described above with respect to FIGS. 4A, 4B, and 5A-5C, in which the difference between the resonance values of the plasmonic nanostructures decreases, in the present embodiment the charge transfer causes a spectral shift such that the difference between the plasmon resonance values of the plasmonic nanostructures increases (i.e., the plasmon resonances shift farther apart).

Referring again to FIG. 1, in a method according to another embodiment, two electrically coupled plasmonic nanostructures 20 and 30 are provided, which exhibit absorption maxima at approximately the same frequencies. Thus, the first resonance value of the first plasmonic nanostructure 20 is substantially equal to the second resonance value of the second plasmonic nanostructure 30.

Figure 8A:
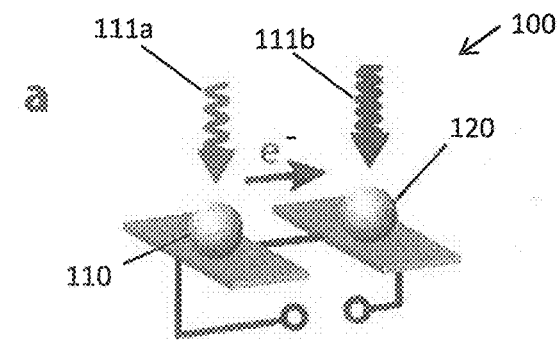
FIG. 8a is a device schematic of two electrically coupled metallic nanostructures having identical structures according to an embodiment of the present invention.
Figure 8B:
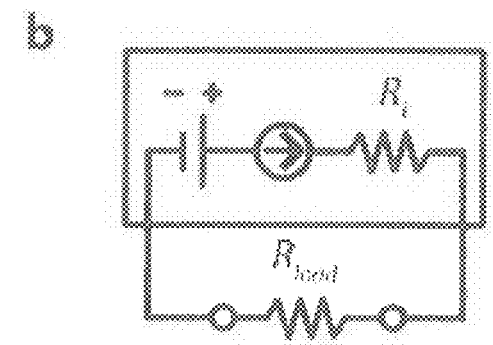
Figure 8C:
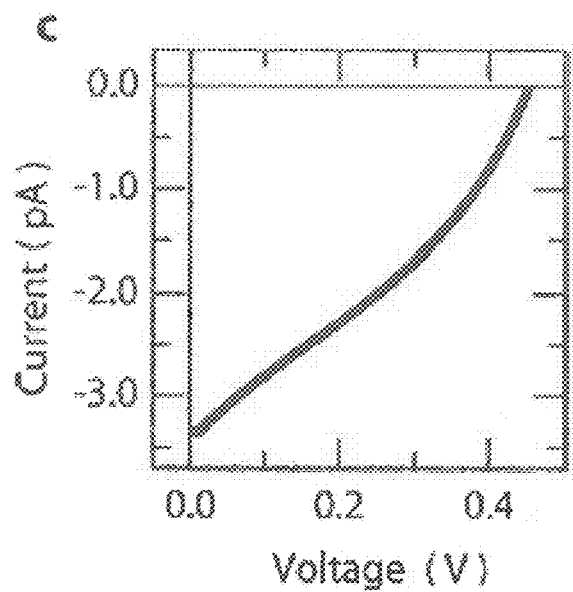

For example, as depicted in FIGS. 8a-8c, in one embodiment the first plasmonic nanostructure 110 has an identical structure to the second plasmonic nanostructure 120. The first plasmonic nanostructure 110 and the second plasmonic nanostructure 120 are both 10 nm radius Ag spheres. Therefore, the first resonance value of the first plasmonic nanostructure 110 is substantially equal to the second resonance value of the second plasmonic nanostructure 120. The first plasmonic nanostructure receives irradiation 111a with a first irradiation value of 550 nm and the second plasmonic nanostructure receives irradiation 111b with a second irradiation value of 500 nm, to induce charge transfer (or transfer of electrons) from the first plasmonic nanostructure 110 to the second plasmonic nanostructure 120.

As a result of the charge transfer, the first plasmonic nanostructure 210 decreases in electron density and the second plasmonic nanostructure 220 increases in electron density. This produces a plasmoelectric potential difference between the first and second plasmonic nanostructures. A current is also generated due to the movement of charge from the first plasmonic nanostructure 210 to the second plasmonic nanostructure 220. The charge transfer also causes a spectral shift such that the first resonance value of the first plasmonic nanostructure 210 shifts to a longer wavelength and the second resonance value of the second plasmonic nanostructure 220 shifts to a shorter wavelength.

A thermodynamic analysis of the optical responses of individual nanostructures in such a device geometry is displayed in columns (a) and (c) of FIG. 6. FIG. 8b is a generally equivalent circuit for the plasmoelectric device 100 shown in FIG. 8a. For similar reasons as those discussed above with respect to FIG. 5B, the plasmoelectric device 100 of FIG. 8a is represented as a voltage source connected in series with a current source and an internal resistance $R_i$. FIG. 8c is a plot of the current-voltage response of the plasmoelectric device of FIG. 8a. According to an embodiment, as shown in FIG. 8c, the induced charge transfer produces an open circuit voltage $V_{OC}=454$ mV and generates a short circuit current $I_{SC}=343$ pA. The maximum optical power conversion efficiency of 14.3% corresponds to a voltage of $V_{load}=241$ mV.

Therefore, according to embodiments of the present invention, to induce charge transfer identical plasmonic nanostructures with the same resonances may receive different incident radiation profiles, and plasmonic nanostructures with different resonances may receive incident radiation at the same frequency.

According to aspects of embodiments of the present invention, charge transport between electrically coupled plasmonic nanostructures results from dependence of the plasmon resonance frequency of each nanostructure on its internal charge density. As such, a power conversion device according to embodiments of the present invention can improve the efficiency of power conversion from optical power to electrical power using an all-metal, or all-conductor, circuit.

Accordingly, in another embodiment, an all-conductor power conversion device includes a first plasmonic nanostructure having a first internal charge density and a second plasmonic nanostructure having a second internal charge density. The first and second plasmonic nanostructures are electrically coupled and are configured to receive irradiation to change the first and second internal charge densities.

In such embodiments, semiconductor or insulating components, such as Schottky barriers or P-N junctions, are not required. However, in some embodiments, semiconductor or insulating components may be optionally included. In addition, according to other aspects of embodiments of the present invention, the power conversion efficiency of a plasmoelectric power conversion device is not limited by the short excited-state lifetime of the internal electrons.

Description of Underlying Theory

Figure 9:
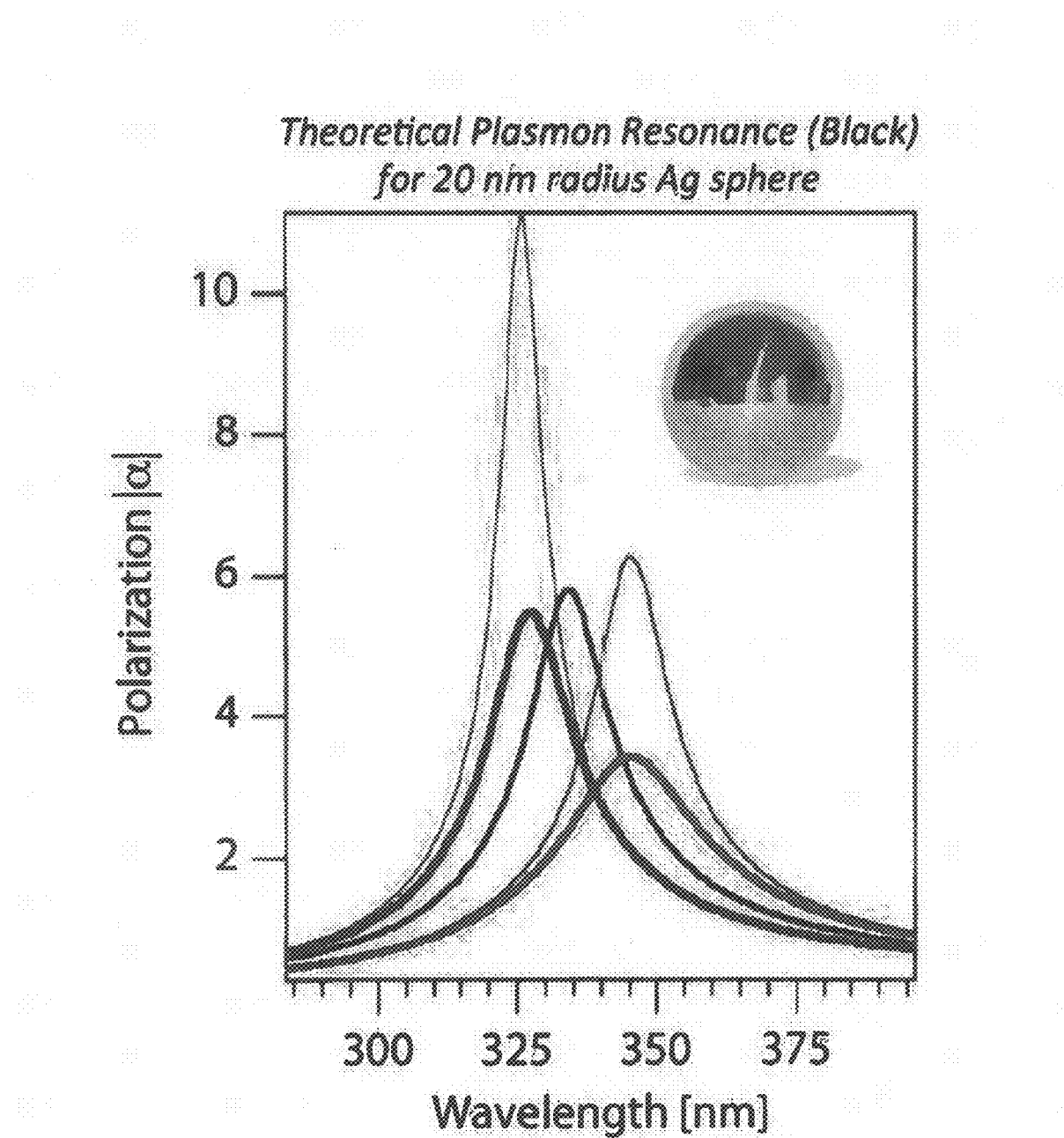
FIG. 9 is a polarization plot showing plasmon resonances for an Ag sphere at various radii and electron density values.

Plasmon resonance generally depends on the size (e.g., radius) of the nanostructure and the electron density n of the nanostructure. FIG. 9 shows the theoretical plasmon resonance for Ag spheres having radii of 15 nm (thin red curve), 20 nm (black curve), and 25 nm (thick red curve) and electron density of $n_e=0.95*n_{Ag}$ (thick blue curve), $n_e=1*n_{Ag}$ (black curve), and $n_e=1.05*n_{Ag}$ (thin blue curve).

FIG. 10A shows an electrochemical cell in which the particle surface charge density of a gold nanoparticle (AuNP) is tuned according to a voltage. As shown by the scattering intensity plot of FIG. 10B, the plasmon resonance frequency $\omega_p$ shifts with changes in voltage, and hence shifts with changes in charge density. For example, the plasmon resonance shifts to longer wavelengths as the voltage is increased, and shifts to shorter wavelengths as the voltage is decreased. In general, a decrease in electron density will "red-shift" a plasmon resonance to an increased wavelength (and thus a lower frequency), while an increase in electron density will "blue-shift" a plasmon resonance to a decreased wavelength (and thus a higher frequency).

Figure 10C:
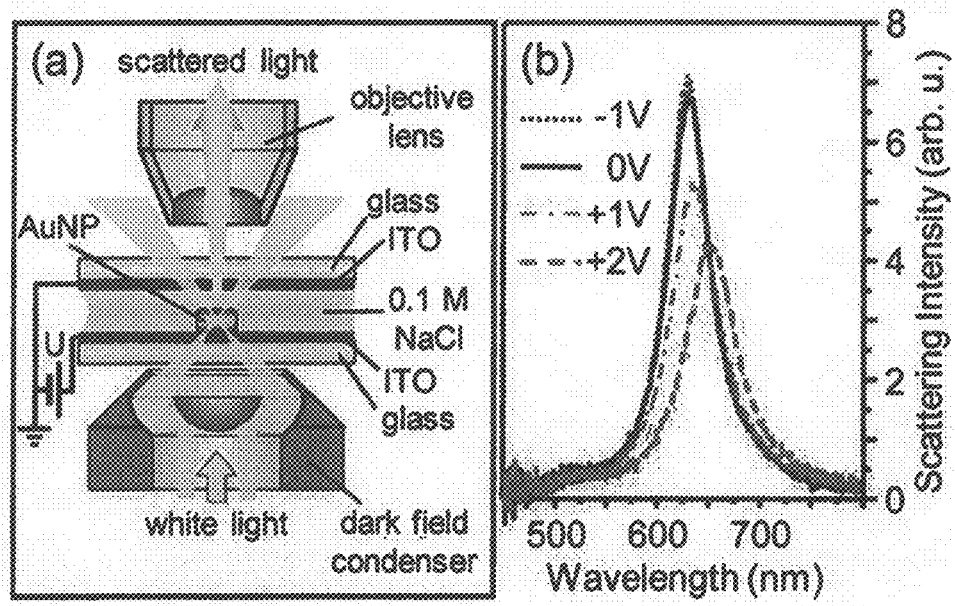
FIG. 10C is a scattering plot showing the dependence of the plasmon resonance on charge density of the complex dielectric function of a plasmonic metal. The inset depicts a graph of wavelength relative to potential.
Figure 10C:
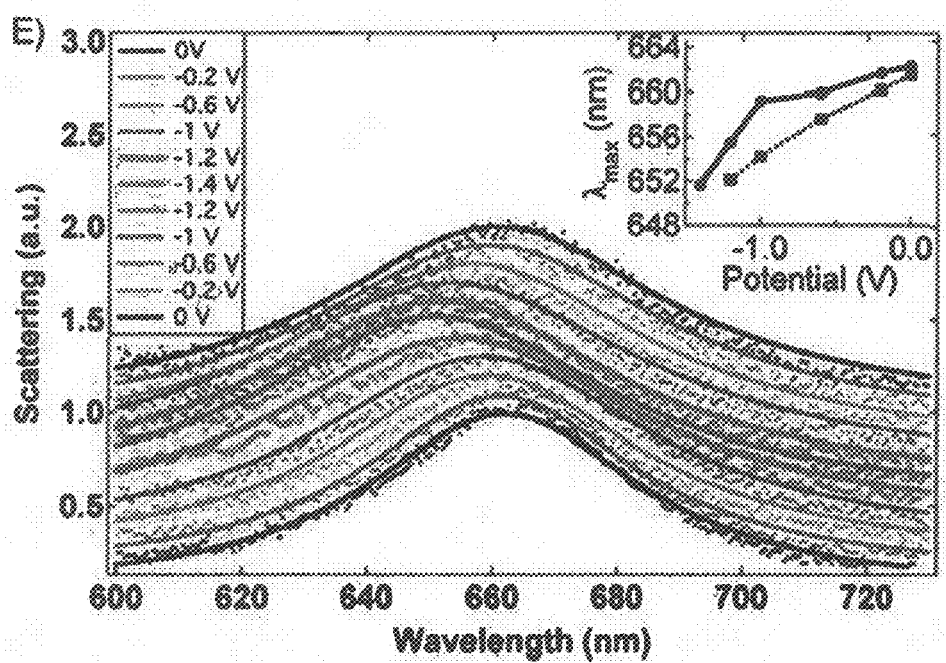

FIG. 10C is a scattering plot showing the dependence of the plasmon resonance on charge density of the complex dielectric function of a plasmonic metal. As shown in FIG. 10B, the shift in plasmon resonance is reversible under both signs of applied voltage.

Figure 11A:
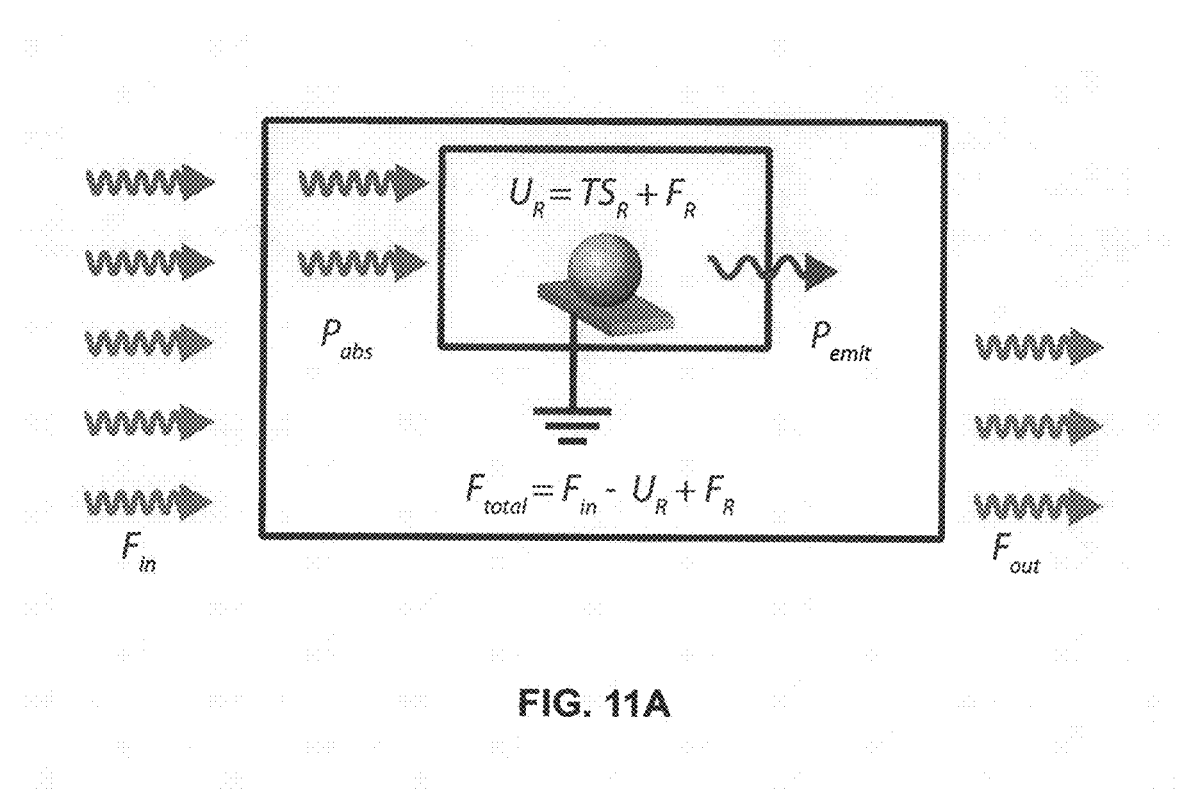
FIG. 11A is an illustration of a thermodynamic model for a single plasmonic nanostructure perturbed from equilibrium by an incident radiation field.

FIG. 11A shows a thermodynamic analysis of a nanostructure perturbed from equilibrium by an incident radiation field. The thermodynamic analysis provides a framework for understanding the plasmoelectric effect. In FIG. 11A, $F_{in}$ represents the free energy available to the system from the incident radiation field; $P_{abs}$ represents the power absorbed by the nanostructure; $U_R$ represents the total internal energy of the nanostructure; $TS_R$ represents the internal heat, or entropy, of the nanostructure; $F_R$ represents the electrochemical free energy of the nanostructure; $P_{emit}$ represents the power re-emitted as thermal radiation; and $F_{out}$ represents the free energy that is converted into useful DC electrical work by the nanostructure.

Figure 11B:
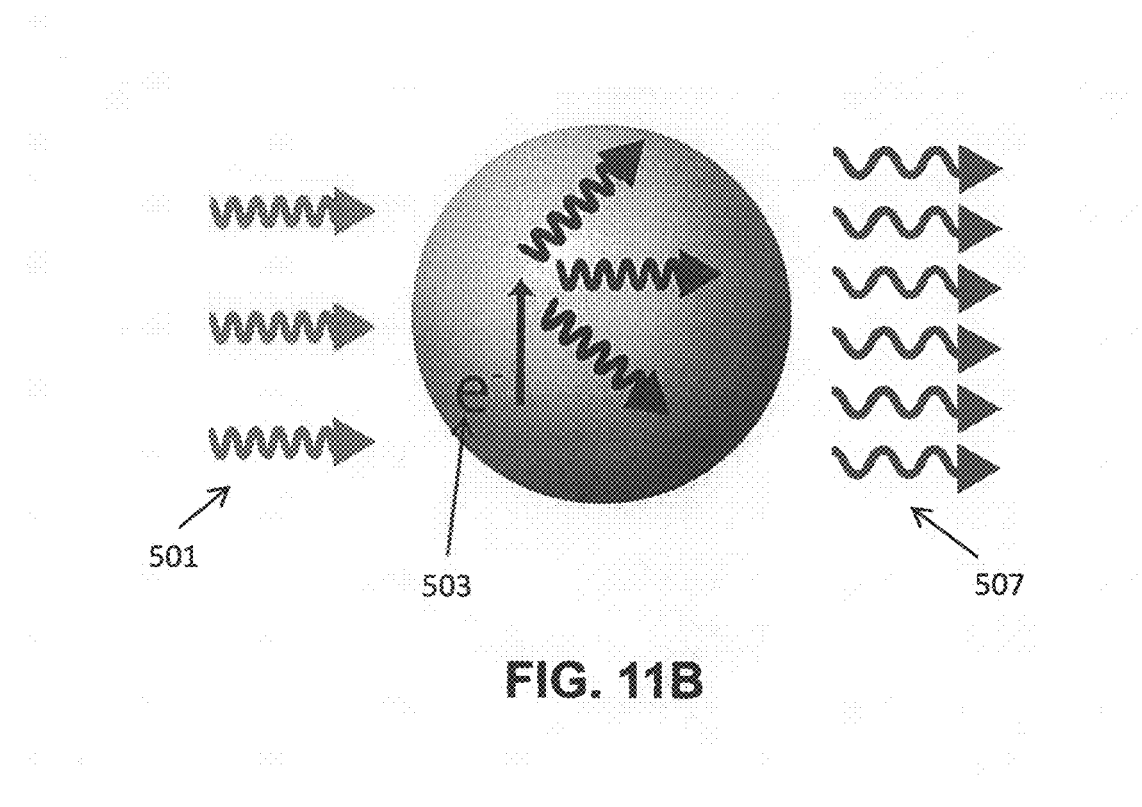
FIG. 11B is an illustration of a single plasmonic nanostructure subject to incident radiation.

The total internal energy of the nanostructure $U_R$ can be expressed according to the equation $U_R=TS_R+F_R$. As shown in FIG. 11B, increased absorption of incident radiation 501 by the nanostructure excites electrons 503, which are converted into thermalized phonons, and increases the internal heat (entropy) $TS_R$ of the nanostructure. Thus, the internal heat $TS_R$ depends on the relative rates of optical absorption and thermalized re-emission 507. The internal heat $TS_R$ is therefore a function of absorption $C_{abs}(n)$ by the nanostructure, the heat capacity of the nanostructure, and the electron-phonon coupling efficiency of the nanostructure.

The total free energy of the nanostructure, $F_{total}$, can be expressed according to the equation $F_{total}=F_{in}-U_R+F_R$. When incident radiation is absorbed by the nanostructure, the charge density of the nanostructure changes and causes a shift in the plasmonic resonance, which increases the electrochemical free energy $F_R$ of the nanostructure. The plasmoelectric effect may also be interpreted as a shift of the electrochemical potential or Fermi level, $\varepsilon_F$, of a plasmonic nanostructure under off-resonant radiation that is analogous to "doping" or "gating" of a semiconductor. The electrochemical free energy $F_R$ can therefore be expressed in terms of the change in electron density n, and defined in terms of the Fermi function as follows:

$$\frac{dF_R}{dn} = \Delta\varepsilon_F \quad (1)$$

Figure 11C:
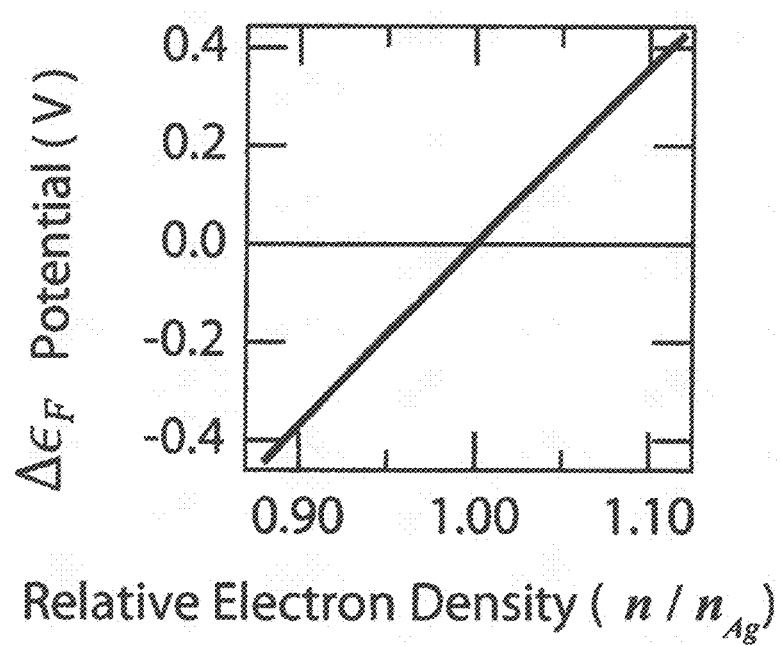
FIG. 11C is a plot showing the relationship between the $\Delta \varepsilon_F$ potential (or electrochemical potential) and relative electron density for a spherical Ag nanoparticle.

FIG. 11C is a plot showing the relationship between the $\Delta\varepsilon_F$ potential (or electrochemical potential) and the relative electron density ($n/n_{Ag}$) for a spherical Ag nanoparticle. According to FIG. 11C, the $\Delta\varepsilon_F$ potential increases as relative electron density increases.

FIG. 6 shows a thermodynamic analysis of three optically excited spherical Ag nanoparticles. When no power is sent to a circuit load, the radiation profile and resonator geometry define the optical response of each sphere. Column (a) shows a 10 nm radius Ag sphere under 1 kW m$^{-2}$ excitation at a wavelength of 550 nm. Column (b) shows a 22 nm radius Ag sphere under 1 kW m$^{-2}$ excitation at a wavelength of 550 nm (the same irradiation as the sphere in column (a)). Column (c) shows a 10 nm radius Ag sphere under 1 kW m$^{-2}$ excitation at a wavelength of 500 nm. The middle row of FIG. 6 shows the electrochemical free energy $F_R$ (black) associated with charge transfer plotted with the internal heat from absorption $\overline{TS_R}$ (green or blue) for each nanostructure as a function of relative electron density ($n/n_{Ag}$). The bottom row of FIG. 6 shows the differential heat from absorption, $$\frac{d\overline{TS}_R}{dn}$$

(green or blue), plotted with the differential free energy, $$\frac{dF_R}{dn}$$

(black), where $$\frac{dF_R}{dn} = \Delta\varepsilon_F.$$

The induced potential depends on the frequency difference of the absorption peak and incident color (or the wavelength of the incident light).

In accordance with the $2^{nd}$ law of thermodynamics, the total free energy of the nanostructure is at a minimum when:

$$\frac{dF_R}{dn} = \frac{d\overline{TS}_R}{dn} \quad (2)$$

Equation 2 defines the electrochemical potential of the nanostructure induced by the plasmoelectric effect and the thermodynamically favored EDDACS $C_{abs}(n)$.

The thermodynamic analysis in FIG. 6 assumes that the electrochemical potential is primarily dependent on the free electron density of the metal as described by the Fermi function. This is generally true for all plasmonic resonators. However, surface effects, other properties of the metal band structure, or local electrostatic fields, for example, may also contribute to the electrochemical potential of a device depending on specific experimental implementations.

According to aspects of embodiments of the present invention, an efficient device electrically couples nanostructures that maximize the total potential difference, such as the nanostructures shown in columns (a) and (b) of FIG. 6 or the nanostructures shown in columns (a) and (c) of FIG. 6. In one embodiment, plasmonic nanostructures with distinct absorption maxima (or distinct plasmon resonance frequencies) are electrically coupled and irradiated at an irradiation value that is an intermediate frequency between the resonance frequencies. In one embodiment, the irradiation value may be approximately an intermediate average of the plasmon resonance frequencies, but the irradiation value may also depend on the intensity of the incident radiation. Charge transfer is thermodynamically favored because of the increased heat from absorption that accompanies the consequent spectral shifts. The plasmoelectric effect therefore produces a thermodynamic potential driving charge transport between irradiated nanostructures.

FIG. 4A shows a device schematic of two electrically coupled metallic nanostructures, each with a different plasmon resonance frequency $\omega_p$. As shown in FIG. 4B, both nanostructures are irradiated at a frequency intermediate between the plasmon resonance frequency $\omega_p$ of each individual nanostructure, which induces electron transport from the high frequency nanostructure to the low frequency nanostructure. According to aspects of embodiments of the present invention, the device geometry shown in FIG. 4A does not require thermal gradients or semiconductor or insulator components, distinguishing it from other devices such as thermoelectric generators, rectennas, photovoltaics, or hot electron optical energy converters.

Figure 12A:
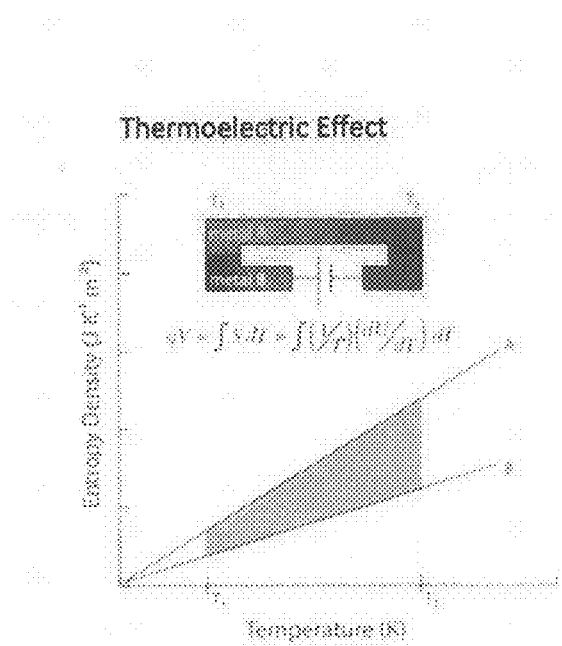
FIG. 12A is an entropy density plot depicting the thermoelectric effect.
Figure 12B:
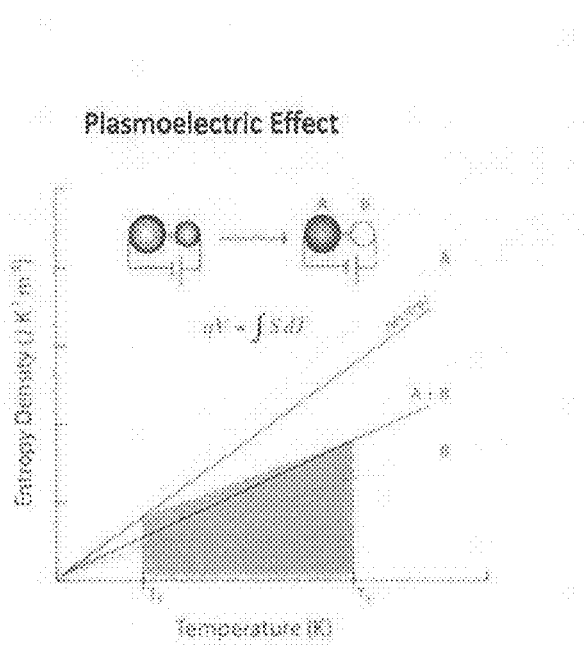
FIG. 12B is an entropy density plot depicting the plasmoelectric effect.

Charge transport is thermodynamically favored due to an increase of the heat from absorbed optical power resulting from the shift of each plasmon resonance frequency $\omega_p$. The shift is produced by charge transfer from the high frequency nanostructure to the low frequency nanostructure. FIG. 12A is a plot of the thermoelectric effect and FIG. 12B is a plot of the plasmoelectric effect. FIGS. 12A and 12B draw a comparison between the thermoelectric effect and the plasmoelectric effect. In the thermoelectric effect, the increase of entropy provided by temperature gradient (the blue area under the curve in FIG. 12A) provides the driving force to move the electrons (from hot to cold) that generate the thermoelectric potential that can perform work. In the plasmoelectric effect, a similar increase of temperature (the blue area under the curve in FIG. 12B) provides entropy that causes plasmoelectric potentials that can perform work. However, the increase of temperature results from the increased optical absorption of the system when charge transfer has occurred, rather than because of an imposed temperature gradient. In both cases, charge transfer is driven by an increase of entropy in the conduction electrons.

Therefore, a plasmoelectric device can be understood as a type of heat engine. The quantity of optically generated heat depends on the absorbed power from the incident radiation field, such that the plasmoelectric potential favoring charge transfer reflects the EDDACS $C_{abs}(n)$ of each nanostructure. The magnitude of the potential corresponds to the increase of the internal temperature and heat (or entropy) generated by a change in charge density.

Using Mie theory and a modified complex dielectric function for Ag that accounts for changes in electron density, it is possible to solve for the total absorption cross section for electrically coupled spherical Ag nanostructures, as a function of electron density n and incident wavelength. The absorption cross section is an indication of the amount of radiation absorbed by a structure for a given optical power density. For example, solar radiation has a power density of approximately 1000 W m$^{-2}$. If a structure has an absorption cross section of 1 m$^2$, it will absorb 1000 W of power when placed in sunlight. Here, for the explicit form of the EDDACS $C_{abs}(n)$, it is assumed that the complex dielectric function of each resonator depends on the bulk plasma frequency of the metal, $\omega^*_p$, according to a simple Drude model, with $$\omega^*_p \propto n^{1/2} \quad (3)$$

For example, to describe an electrically neutral Ag plasmonic resonator, a $6^{th}$ order, multiple oscillator Lorenz-Drude model of the complex dielectric function of Ag is applied, fit to data from the Palik Handbook. Rakic and coworkers outline the method used in A. Rakic, A. Djurisic, J. Elazar, M. Majewski, Appl Optics 1998, 37, 5271 (1998), the entire content of which is incorporated herein by reference. This dielectric function accurately reproduces the observed extinction spectra of spherical Ag nanoparticles when input into the exact analytic solutions to Maxwell's equations provided by Mie theory. To describe the dependence of the complex dielectric function on changes of electron density for Ag, it is assumed that all terms in the dielectric function that depend on the bulk plasma frequency, $\omega^*_p$, depend on electron density, according to the following Drude model:

$$\omega^*_p = \left( \frac{n \cdot e^2}{\varepsilon_o \cdot m^*_e} \right)^{1/2} \quad (4)$$

where e is the electron charge, $\varepsilon_o$ is the permittivity of free space, and $m^*_e$ is the electron effective mass. This strategy is consistent with other work that examined carrier density-dependent plasmon shifts, for example in doped semiconductors, electrochemical cells, or at metal surfaces during ultrafast pump-probe measurements.

Figure 13:
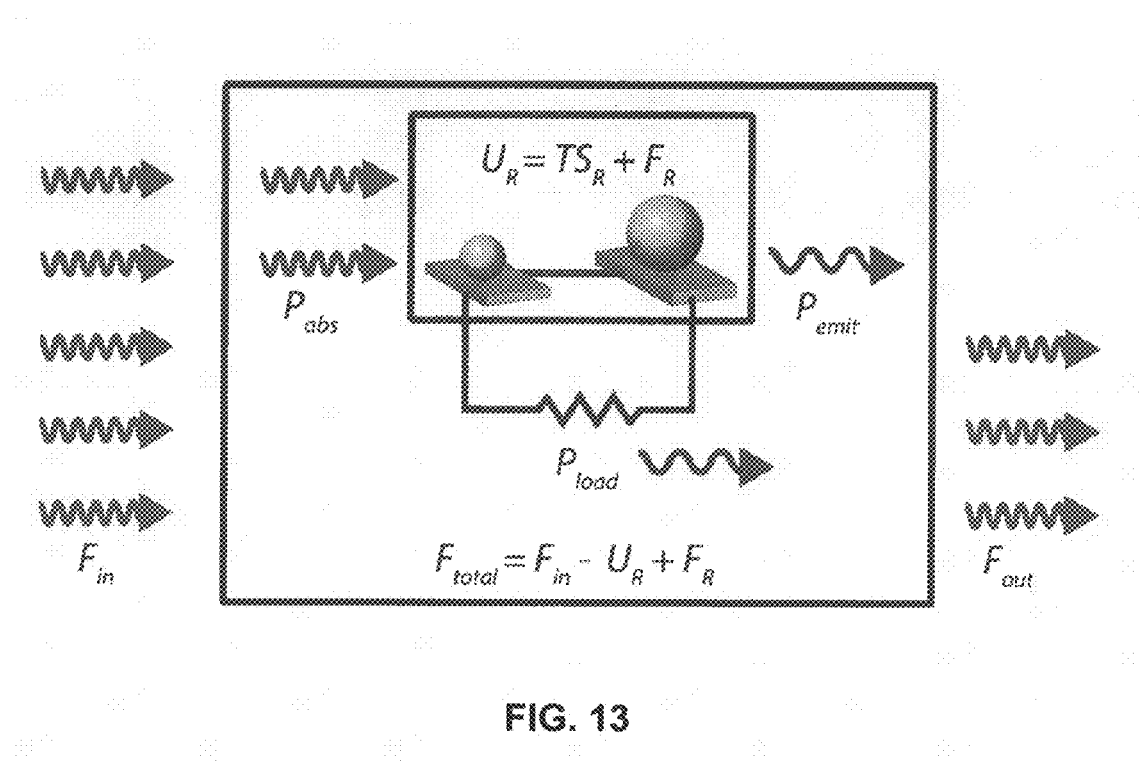
FIG. 13 is an illustration of a thermodynamic model for a plasmoelectric device according to an embodiment of the present invention. The depicted plasmoelectric device is perturbed from equilibrium by an incident radiation field.

For a given nanostructure and radiation environment, the magnitude of the plasmoelectric potential depends on $C_{abs}(n)$ and thus can be deduced from a simple thermodynamic argument. FIG. 13 shows a system containing a plasmoelectric device according to an embodiment of the present invention. The plasmoelectric device is perturbed from equilibrium by an incident optical power density (or incident radiation) $I_\lambda$. In steady-state, this radiation is a Helmholtz free energy per unit volume available to the system, $F_{in}$, that can perform work on the plasmoelectric device. The system can lower the total Helmholtz free energy by absorbing this free energy from the radiation field, raising the temperature and entropic heat, $TS_R$, of the nanostructures. Stated another way, optical absorption mediates the conversion process, which corresponds to electron excitation followed by phonon thermalization.

A spectral shift of the absorption maxima of the plasmoelectric device into resonance with the incident optical frequency provides a significant decrease of the free energy of the radiation field $F_{in}$ by increasing $TS_R$. However, spectral shifts depend on a change of the electron density in each of the coupled resonators, as defined by $C_{abs}(n)$, and therefore increase the electrochemical free energy $F_R$ of the nanostructures compared to an equilibrium configuration of uncharged neutral Ag nanostructures.

In accordance with the $2^{nd}$ law of thermodynamics, the device configuration that minimizes the total free energy of the system with respect to changes of the electron density n of each nanostructure occurs when Equation 2 is met. Under steady-state conditions, conservation of energy implies that all of the power absorbed by the plasmonic nanostructures, $P_{abs}$, is either sent to a load, $P_{load}$, or re-emitted as thermal radiation, $P_{emit}$. This absorbed power depends on the product of the $C_{abs}(n)$ of the device and the incident radiation, $I_\lambda$.

$$P_{abs} = I_\lambda \cdot C_{abs}(n) = P_{emit} + P_{load} \quad (5)$$

The specific $C_{abs}(n)$ the device adopts in steady-state defines the total internal energy $U_R$, heat $TS_R$, and free energy $F_R$ of the nanostructures. These relations are derived explicitly below, and reflect the internal temperature and charge density associated with a given configuration. For changes of electron density, $$\frac{dU_R}{dn} = \frac{dTS_R}{dn} + \frac{dF_R}{dn} \quad (6)$$

If a nanostructure were always electrically neutral, an increase of internal energy due to increased absorption would be converted entirely into heat, resulting in an increase of temperature. However, for this system the increase of heat is moderated by the necessary fraction that is converted into electrochemical free energy.

$$\frac{dTS_R}{dn} = \frac{d\overline{TS}_R}{dn} - \frac{dF_R}{dn} \quad (7)$$

Here, $\overline{TS}_R$ is the equivalent internal entropy and temperature that an electrically neutral nanostructure with the same $C_{abs}(n)$ would exhibit under steady-state irradiation if no energy went to electrochemical work. An expression for $\overline{TS}_R$ is provided below. A plasmoelectric device can increase entropy (and decrease free energy) with any charge configurations that increase the absorbed light energy $\overline{TS}_R$ by more than the electrochemical work $F_R$ used to generate such an absorption cross section.

Accordingly, the total free energy in the system depends on the fraction of incident radiation that is converted into the internal energy of the resonators and the fraction of that internal energy that is further converted into the electrochemical free energy associated with charge transfer.

$$F_{total} = F_{in} - U_R + F_R \quad (8)$$

Because the incident power has no dependence on the charge configuration of the nanostructures, the following expression describes the minimum free energy of the system with respect to changes of electron density:

$$\frac{dF_{total}}{dn} = 0 = \frac{dF_R}{dn} - \frac{dU_R}{dn} \quad (10)$$

Substitution of Equations 6 and 7 shows that Equation 9 corresponds to a configuration of the nanostructures where $$\frac{dF_R}{dn} = \frac{d\overline{TS}_R}{dn} \quad (11)$$

Equation 10 describes the thermodynamic favorability of charge transfer between nanostructures. Thus, in general, the minimum free energy of the system corresponds to a configuration of charged, non-neutral particles. Equation 10 also defines the electrochemical potential of each nanostructure at the thermodynamically favored value of n. This condition is summarized for the calculated optical response of spherical Ag nanostructures in FIG. 6, in the limit that no power is sent to a circuit load.

The steady-state internal temperature and entropy of a nanostructure while it is irradiated at a single wavelength and intensity $I_\lambda$, for a specific $C_{abs}(n)$ can be determined according the analysis below. This analysis may be extended to larger incident bandwidths by accounting for the spectral power absorbed for some finite wavelength range. Considering a device like that depicted in FIG. 13, a two-temperature model describes the power flow between the conduction electrons, phonons, the circuit load, and the ambient environment during irradiation. In general, the rate of energy exchange between electrons and phonons depends on the electron-phonon coupling constant, g, the respective lattice and electronic heat capacities, $C_l$ and $C_e$, and the relative temperature difference. The following assumptions are made regarding the device behavior, summarized in the coupled equations 11 and 12.

$$C_l \frac{dT_l}{dt} = g(T_e - T_l) - P_{emit} + P_{ambient} \quad (11)$$

$$C_e \frac{dT_e}{dt} = -g(T_e - T_l) + I_\lambda \cdot C_{abs}(n) - P_{load} \quad (12)$$

All of the optical power absorbed by the electrons, $I_\lambda \cdot C_{abs}(n)$, is emitted into the phonons, unless that power is lost to the circuit load, $P_{load}$. Therefore, resonant optical emission from excited electron-hole pairs is not considered, which occurs with an efficiency of less than $10^{-6}$ for metal nanoparticles. It is also assumed that the phonons only exchange energy with the ambient environment directly via black body emission, $P_{emit}$, or black body absorption, $P_{ambient}$, in accordance with the Stefan-Boltzmann law. The form of Equations 11 and 12 can be generalized to account for other energy pathways, such as the rate of heat loss through substrate diffusion, for example. Under steady-state conditions, these coupled equations give the following expression for the electron and phonon temperature of a resonator, $$T_e = \frac{I_\lambda \cdot C_{abs}(n) - P_{load}}{g} + T_l \quad (13)$$

$$T_l = \left( \frac{I_\lambda \cdot C_{abs}(n) - P_{load} + \sigma \varepsilon A_s T_{ambient}^4}{\sigma \varepsilon A_s} \right)^{1/4} \quad (14)$$

where $A_s$ is the surface area of the particle, $\varepsilon$ is the emissivity ($\varepsilon=1$ for a perfect black body) and $\sigma=5.67\times10^{-8}$ J s$^{-1}$ m$^{-2}$ K$^{-4}$ is the Stefan-Boltzmann constant.

The total steady-state internal heat of the resonator induced by absorption depends on the temperature-dependent thermal energy of both phonons, $T_l S_l$, and electrons, $T_e S_e$.

$$\overline{TS}_R = T_l S_l + T_e S_e \quad (15)$$

The high temperature lattice heat capacity of Ag defines the increase of phonon energy with temperature. These calculations use the reported value of $C_l=2.44\times10^6$ J m$^{-3}$ K$^{-1}$. The lattice heat capacity does not depend explicitly on electron density, so the phonon energy of the resonator depends on electron density only through the dependence of $T_l$ on the $C_{abs}(n)$ expressed in Equation 14. However, the internal electronic heat is a function of the electron density, n, and electronic temperature, $T_e$, as described by the Sommerfeld model for the electronic heat capacity of metals.

$$T_e S_e = \frac{m_e k_B^2 V \pi^{2/3}}{\hbar^2 3^{2/3}} T_e^2 n^{1/3} \quad (16)$$

Here, V is the particle volume, $m_e$ is the electron rest mass, $\hbar$ is the reduced Plank constant, and $k_B$ is the Boltzmann constant. Increases of electronic temperature efficiently compensate for entropy losses associated with decreased electron density in a plasmoelectric device.

Figure 14:
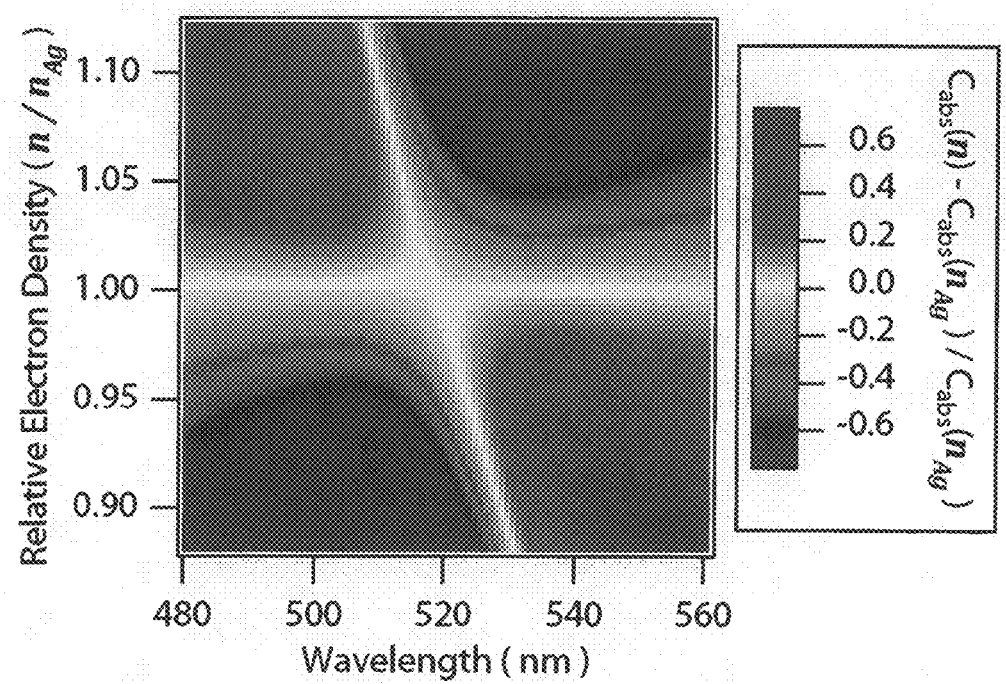
FIG. 14 depicts an electron density-dependent absorption cross section (EDDACS) for a 10 nm radius Ag sphere surrounded by a dielectric matrix with a refractive index n=2.

FIG. 14 shows the change of the EDDACS $C_{abs}(n)$ according to Mie theory relative to the absorption cross section corresponding to the electron density $n_{AG}$ for a neutral Ag particle. The modeled structure is a 10 nm radius Ag sphere surrounded by a dielectric matrix with a refractive index n=2. For an arbitrary plasmonic resonance, increasing or decreasing electron density will generally increase absorption at shorter or longer incident wavelengths, respectively. Illumination with radiation spanning a large bandwidth of incident wavelengths above or below the neutral particle absorption peak, which is near 520 nm, will favor charge transfer to or from the particle, as predicted by the thermodynamic analysis presented above.

FIG. 15A shows the EDDACS $C_{abs}(n)$ for an individual 20 nm radius Ag sphere and FIG. 15B shows the EDDACS $C_{abs}(n)$ for an individual 25 nm radius Ag sphere. As shown, each individual particle absorption peak blue-shifts with increasing electron density. FIG. 15C depicts the total absorption cross section of a two-particle system having the 20 nm radius Ag sphere and the 25 nm radius Ag sphere electrically coupled to one another. The total absorption cross section approaches a maximum near 485 nm, when the small sphere loses approximately 7% electron density and the large sphere gains approximately 7% electron density.

FIG. 15D is the same plot as FIG. 15C, minus the absorption of the system at a neutral charge configuration. When the spheres are electrically coupled, the system can increase entropy with charge configurations that increase the absorbed light energy more than the electrical work used to generate those configurations. A device with high conversion efficiency will maximize the bandwidth and minimize the work associated with the lower red region of the plot in FIG. 15D. In addition, excitation at frequencies in the upper red region will reverse the polarity of the device.

FIG. 16A is an energy diagram for a 20 nm and 23 nm radii Ag particle couple irradiated at a wavelength of 485 nm. FIG. 16B shows the change in absorption cross section of the Ag particle couple. The green curve represents the electrochemical work used to generate such an absorption cross section. The red curve represents the change in absorbed energy, $\tau^* I_\lambda$. The product $\tau^* I_\lambda$ defines the steady-state energy available to the electrons when multiplied by the absorption cross section. For entropy to increase compared with a neutral configuration, the increase in absorbed energy (red) should be larger than the work (green). FIG. 16C is a plot of the current-voltage response corresponding to the energy diagram of FIG. 16A.

Analysis of FIGS. 14 through 16C suggests several different power conversion strategies via the plasmoelectric effect. For each scenario, the constraint is imposed that the nanostructures are isothermally coupled so that there is no additional thermoelectric potential across the device due to a thermal gradient between the nanostructures.

According to one embodiment, two electrically coupled nanostructures have different structures, e.g. particle radii, or surrounded by a different dielectric matrix, so that they exhibit absorption maxima at distinct frequencies. The nanostructures are chosen so that the upper left (red) quadrant of a $C_{abs}(n)$ plot like that in FIG. 14, describing the low frequency nanostructure, overlaps in the same wavelength range as the lower right quadrant of the similar plot describing the high frequency nanostructure. Incident radiation with wavelengths contained in the overlap region promotes charge transfer from the high frequency nanostructure to the low frequency nanostructure, and the absorption maxima of both shift towards a frequency in the overlap region. This same scenario is depicted in FIG. 4B.

According to another embodiment, two electrically coupled nanostructures having the same device geometry as described above are irradiated at wavelengths predominantly outside (or different from) the maximum absorption wavelength for the neutral particles. According to yet another embodiment, two nanostructures with identical plasmon resonant absorption maxima but irradiated at different wavelengths can be electrically coupled.

FIG. 8a shows a device schematic of a plasmoelectric device according to an embodiment of the present invention. In FIG. 8a, a plasmoelectric device 100 includes two electrically coupled metallic nanostructures 110 and 120. In one embodiment, the nanostructures 110 and 120 are 10 nm radius Ag spheres in n=2 dielectric and irradiated under 1 kW m$^{-2}$ excitation. One nanostructure is irradiated at a wavelength of 550 nm while the other nanostructure is irradiated at a wavelength of 500 nm.

To analyze the current-voltage response of the device geometry shown in FIG. 8a, an electrical coupling scheme is assumed that maintains the single particle absorption profile calculated by Mie theory. With this EDDACS, it is possible to derive an expression for the steady-state internal heat in order to model the full current-voltage response of a plasmoelectric device connected to an external load. Equation 10 also determines the efficiency with which the absorbed power can be sent to an external load. Since the free energy of the resonators must be extracted at a rate consistent with the power conservation law expressed in Equation 5, Equations 10 and 5 can be solved for a completed description of the current response of the device connection to a circuit load. Equation 10 is first expressed in terms of the Fermi level, $\varepsilon_p$, of an electron gas $$\frac{dF_R}{dn} = \Delta\varepsilon_F = \frac{d\overline{TS}_R}{dn} \quad (17)$$

where $\Delta\varepsilon_F = \varepsilon_F(n) - \varepsilon_F(n_{Ag})$ is given by the Fermi function:

$$\varepsilon_F = h^2/2m_e \cdot (3\pi^2 n)^{2/3} \quad (18)$$

The value of n that satisfies equation 17 defines the steady-state electrochemical potential on each nanostructure. These differential relationships are summarized in FIG. 6 in the limit that no power is sent to a circuit load.

The total electrostatic potential, $\phi_{tot}$, equals the difference between the potentials on each individual nanostructure when isothermally coupled.

$$\phi_{tot} = (\Delta\varepsilon_F)_A - (\Delta\varepsilon_F)_C \quad (19)$$

Any temperature gradient between nanostructures would produce an additional thermoelectric potential. Based on columns (a) and (c) of FIG. 6, it is expected that the total electrostatic potential $\phi_{tot} \approx 500$ mV for this device geometry at open circuit, i.e. when no power is sent to a circuit load and if any temperature gradient is neglected. The magnitude of the total electrostatic potential $\phi_{tot}$ decreases when power is sent to load because of the consequent decrease of internal temperature as expressed in Equations 13 and 14.

The equivalent circuit for the plasmoelectric device 100 is shown in FIG. 8b. If the internal resistance $R_i$ is sufficiently small, the charge transfer induced by the plasmoelectric effect produces a voltage across the load, $V_{load}$, equivalent to the potential across the nanostructures $$V_{load} = \phi_{tot} \quad (20)$$

The power through the load (or the power lost to the circuit load), $P_{load}$, relates to this voltage drop $V_{load}$ and the magnitude of the current through the load, $I_{load}$ according to Ohm's law:

$$P_{load} = V_{load} \cdot I_{load} \quad (21)$$

As such, the magnitude of the plasmoelectric potential depends on the power lost to the load through Equations 13 and 14, but this potential also defines the power lost to the load through Equations 20 and 21. Stated another way, $V_{load}$ depends on $I_{load}$ through the temperature dependence of Equation 17, but $V_{load}$ also defines $I_{load}$ through Equation 18. To solve these coupled equations for the current response, an independent expression relating $P_{load}$ with the device response via the EDDACS is needed.

Conservation of energy, Equation 5, provides the necessary constraint on $P_{load}$ to solve these coupled equations. The power absorbed by the plasmonic nanostructures is expressed in Equation 5. When no absorbed power is used to transfer charge between nanostructures, both nanostructures exhibit a neutral charge configuration, and no potential develops across the load. Therefore, Equation 5 reduces to:

$$P_{abs}(n_{AG}) = I_\lambda \cdot C_{abs}(n_{AG}) = P_{emit}(n_{AG}) \quad (22)$$

This equation is subtracted from both sides of Equation 5 to give $$P_{abs}(n) - P_{abs}(n_{AG}) = P_{emit}(n) - P_{emit}(n_{AG}) + P_{load}(n) \quad (23)$$

This formula emphasizes that only the increased fraction of absorbed power due to charge transfer can be used to maintain the non-equilibrium configuration of internal electrochemical free energy. Then, the maximum power that can be sent to a load is the difference of absorbed power at the thermodynamically favored configuration compared with a neutral configuration. For a given incident radiation profile, we calculate the thermodynamically favored $\phi_{tot}$ and resulting current through the load $I_{load}$ when $P_{load}$ takes the limiting minimum value of zero, corresponding to open circuit, through the maximum possible value, $P_{load} = P_{abs}(n) - P_{abs}(n_{AG})$, corresponding to short circuit.

The solved current and voltage values for this range of $P_{load}$ are displayed in FIG. 8c. According to an embodiment, the short circuit current $I_{SC}$=343 pA and the open circuit voltage $V_{OC}$=454 mV. The plotted value of the open circuit voltage $V_{OC}$ is approximately 50 mV lower than the estimated value of $\phi_{tot} \approx 500$ mV. This difference reflects the constraint that both nanostructures are isothermally coupled as modeled, and that as a pair, they adopt the average temperature of the nanostructures displayed in columns (a) and (c) of FIG. 6.

The optical power conversion efficiency may be calculated by dividing the value of $P_{load}$ at each value of $V_{load}$ by the absorbed power from the radiation field $P_{abs}(n)$ when the EDDACS $C_{abs}(n)$ adopts the value of n corresponding to that potential. The highest conversion efficiency for the device may not correspond to operation at the maximum power point of the current-voltage response, because the absorbed power depends strongly on the potential adopted by the nanostructures. For the device geometry shown in FIG. 8a the maximum optical power conversion efficiency of 14.3% corresponds to a voltage of $V_{load}$=241 mV, which is about 46 mV lower than the voltage that maximizes power through the load, at $V_{load}$=287 mV.

FIG. 5A shows a device schematic of a plasmoelectric device according to another embodiment of the present invention. In FIG. 5A, a plasmoelectric device 200 includes two electrically coupled metallic nanostructures 210 and 220, each with a different plasmon resonance frequency $\omega_p$. Both nanostructures 210 and 220 are irradiated at a frequency intermediate between the plasmon resonance frequency $\omega_p$ of each individual nanostructure, which induces electron transport from the high frequency nanostructure to the low frequency nanostructure. In one embodiment, the plasmonic nanostructure 210 is a 10 nm radius Ag sphere irradiated at a wavelength of 550 nm and the plasmonic nanostructure 220 is a 20 nm radius Ag sphere irradiated at a wavelength of 550 nm.

FIG. 5B is the equivalent circuit of the plasmoelectric device shown in FIG. 5A. The total electrostatic potential, $\phi_{tot}$, equals the difference between the potentials on each individual nanostructure when isothermally coupled.

$$\phi_{tot}=(\Delta\varepsilon_F)_A-(\Delta\varepsilon_F)_B \quad (24)$$

Equations 17 through 23 may be used to analyze the current-voltage response of the device geometry shown in FIG. 5A.

FIG. 5C is a current-voltage plot showing the power curve of the circuit in FIG. 5B. According to an embodiment, the short circuit current $I_{SC}$=68 pA and the open circuit voltage $V_{OC}$=436 mV. The maximum optical power conversion efficiency of 15.6% corresponds to a voltage of $V_{load}$=242 mV.

According to still other embodiments, the above thermodynamic analysis may be extended to device geometries optimized for broadband optical power conversion. Aspects of embodiments of the present invention relate to strategies for maximizing conversion efficiency in broadband devices that take advantage of the spectral tunability of plasmonic nanostructures. Such devices may allow for more efficient broadband conversion of the entire solar spectrum.

To extend the analysis to broadband incident radiation, it is necessary to consider the coupled Equations 5 and 10 when the internal heat of the nanostructures depends on a specific incident spectral radiation profile. Because the maximum power that can be sent to a load depends on the difference $P_{abs}(n)-P_{abs}(n_{AG})$, an efficient device will maximize the increase of absorbed power for some change of electron density.

FIG. 2 depicts a plasmoelectric device 300 for broadband power conversion according to an embodiment of the present invention. According to some embodiments, the peaks of the absorption maxima of the nanostructures in the arrays should be as sharp as possible (i.e., each absorption maxima has a small line width). The term "line width" refers to the wavelength spread of an absorption peak at half of its maximum intensity (or "full width at half maximum," FWHM). In the limit that the optical splitting element 305 and resonator line widths restrict absorption of any of the incident radiation to configurations that can maximize absorption via charge transfer, then all of the absorbed radiation power could in principle be sent through a circuit load. However, because a plasmoelectric device may be viewed as a type of heat engine, it is expected that the thermodynamic power conversion efficiency for such an arrangement is constrained by Carnot analysis. Thus, an optimized broadband power conversion device according to embodiments can theoretically convert optical power at an efficiency that is only constrained by the fundamental thermodynamic limitation of an ideal heat engine, as described by Carnot analysis. According to Carnot analysis, the theoretical maximum efficiency $\eta_{max}$ of any heat engine may be defined in terms of the temperatures it operates between:

$$\eta_{max} = 1 - \frac{T_c}{T_h} \quad (25)$$

where $T_h$ is the absolute temperature of the hot source and $T_c$ is the absolute temperature of the cold sink.

According to some embodiments, a plasmoelectric device for broadband conversion approaches the limiting Carnot efficiency of >90%, thereby rivaling the theoretical power conversion efficiency of conventional photovoltaic and thermoelectric devices. The relevant temperature difference for the Carnot analysis corresponds to the steady-state temperature of the nanostructure array at the thermodynamically favored value of electron density versus the corresponding electron density for a neutral particle in a dark ambient.

Various methods may be used to observe the plasmoelectric effect and measure the plasmoelectric potential, including optical measurement, electrical measurement, KPFM, and photoelectrochemical measurement. The following Examples are presented for illustrative purposes only, and do not limit the scope of the present invention.

Examples—Proof of Underlying Theory

Figure 17A:
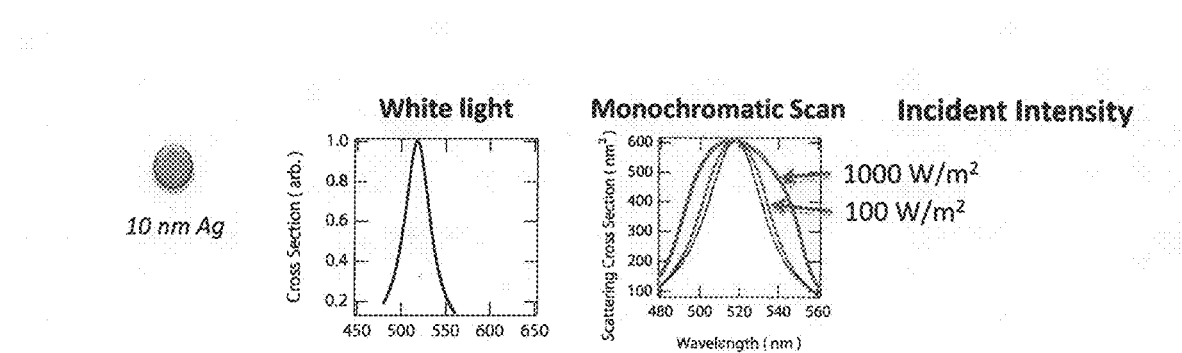
FIG. 17A shows a cross section plot and a scattering cross section plot for a 10 nm radius Ag sphere.
Figure 17B:
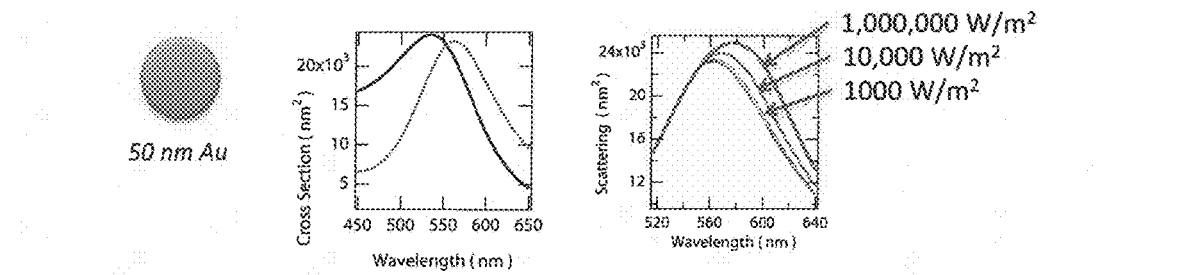
FIG. 17B shows a cross section plot and a scattering plot for a 50 nm radius Au sphere.

FIGS. 17A and 17B demonstrate the apparent broadening of scattering spectra under monochromatic excitation due to the frequency-dependent change of charge density. The cross section plot on the left of FIG. 17A depicts an absorption curve (solid line) and a scattering curve (dotted line) of a 10 nm radius Ag sphere irradiated with white light. As shown in the cross section plot, the absorption curve and scattering curve overlap in frequency and exhibit a sharp peak at the plasmon resonance wavelength. The scattering cross section plot on the right of FIG. 17A depicts absorption curves (solid line) and a scattering curve (dotted line) of the 10 nm radius Ag sphere irradiated with a monochromatic scan under incident intensities of 1000 W m$^{-2}$ and 100 W m$^{-2}$. As shown in the scattering cross section plot, the absorption and scattering curves exhibit pronounced, symmetric broadening when irradiated with the monochromatic scan.

The cross section plot on the left of FIG. 17B depicts an absorption curve (solid line) and a scattering curve (dotted line) of a 50 nm radius Au sphere irradiated with white light. As shown in the cross section plot, the absorption curve and the scattering curve are broader than in the cross section plot of FIG. 17A. In addition, the scattering curve is red-shifted relative to the absorption curve. The scattering plot on the right of FIG. 17B depicts absorption curves (solid line) and a scattering curve (dotted line) of the 50 nm radius Au sphere irradiated with a monochromatic scan under incident intensities of 1,000,000 W m$^{-2}$, 10,000 W m$^{-2}$ and 1000 W m$^{-2}$. As shown in the scattering plot, the absorption and scattering curves exhibit asymmetric broadening of the scattering signal.

Figure 17C:
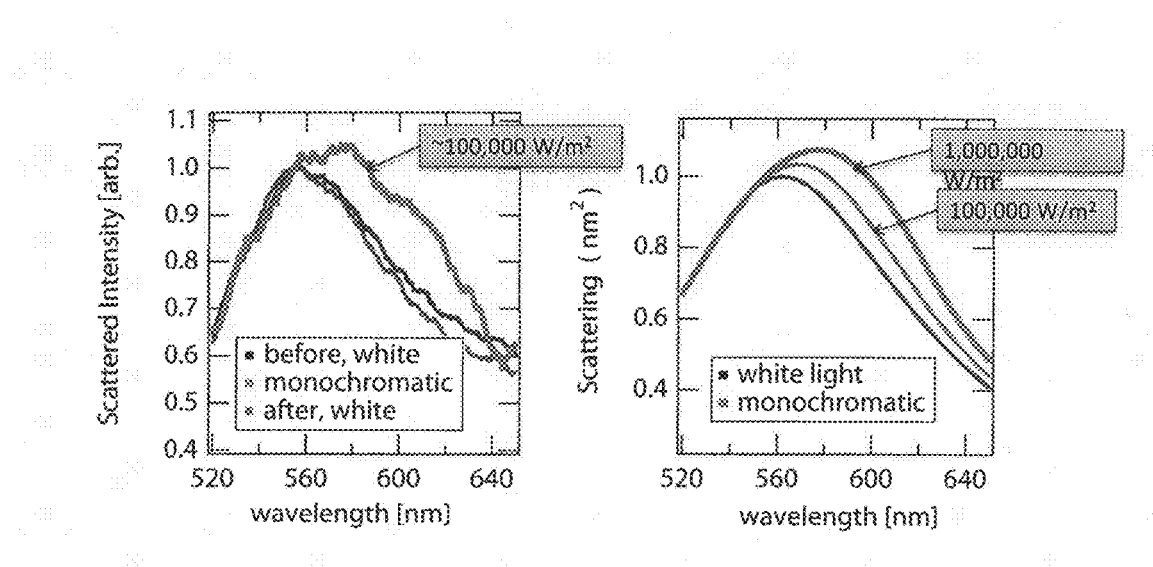
FIG. 17C shows an experimentally measured scattering intensity plot and a theoretical calculated scattering plot comparing white light scattering and monochromatic scattering.

The scattering cross section plot of FIG. 17A and the scattering plot of FIG. 17B illustrate that the peaks of the absorption curves broaden more with increasing monochromatic radiation intensity. In addition, higher intensity of incident radiation produces weaker, asymmetric broadening. FIG. 17C shows an experimental scattered intensity plot (left) and theoretical scattering plot (right) comparing white light scattering (gray and black traces) and monochromatic scattering (green trace). In the theoretical scattering plot on the right, only a red-shift is observed from monochromatic scattering. In the experimental scattered intensity plot on the left, the gray and black traces show the white light curve before and after the monochromatic scan. The overlap of the gray and black traces shows that the plasmoelectric response is reversible. The green trace shows more scattering from 560 nm-640 nm compared with the gray and black traces (i.e., the white light curves), indicating that a plasmoelectric potential was induced by the monochromatic light. The comparison of the white light spectra with the monochromatic spectra confirms the plasmoelectric effect.

Figure 18A:
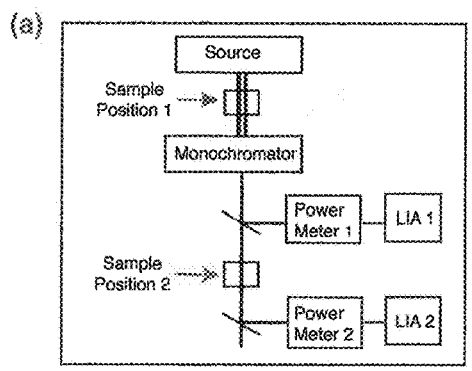
FIG. 18a is a diagram of probing the absorption spectrum of a 60 nm diameter Au colloid in water with broadband or single frequency radiation by changing the sample position with respect to a grating monochrometer and white light source.
Figure 18B:
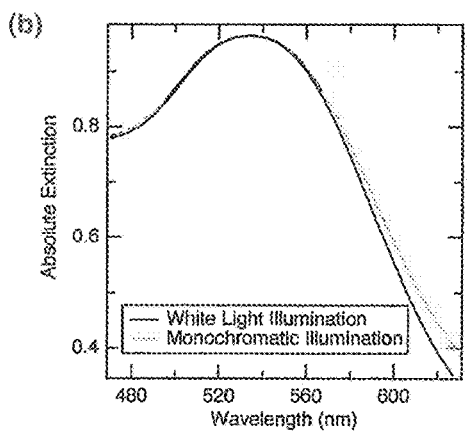
Figure 18C:
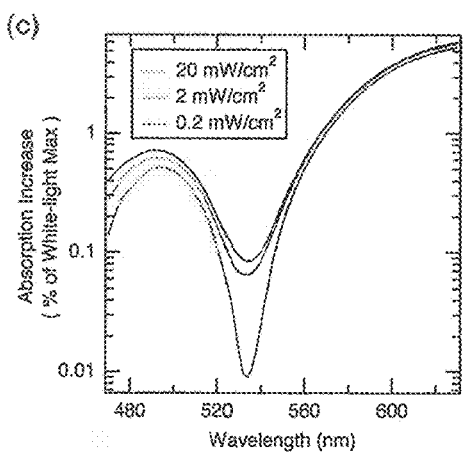

FIG. 18a is a diagram of probing the absorption spectrum of a 60 nm diameter Au colloid in water with broadband or single frequency radiation by changing the sample position with respect to a grating monochromer and white light source. FIG. 18b is a plot of the absolute excitation of the 60 nm diameter Au colloid being probed in FIG. 18a. Samples probed monochromatically (red trace) exhibited systematic increases of absorption compared to the spectrum obtained during broadband illumination (black trace). FIG. 18c is a plot of the absorption increase exhibited by the 60 nm diameter Au colloid being probed FIG. 18a. The power- and frequency-dependent increases of absorption indicate an optically induced change of charge density consistent with the predicted plasmoelectric response for this system.

Figure 19A:
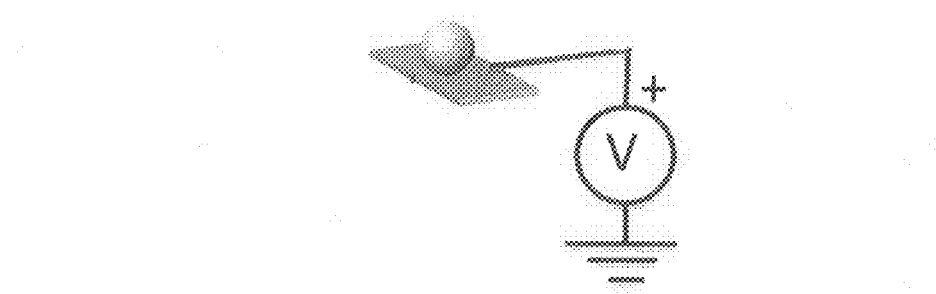
FIG. 19A is a device schematic of a 10 nm radius Ag sphere irradiated with monochromatic light.
Figure 19B:
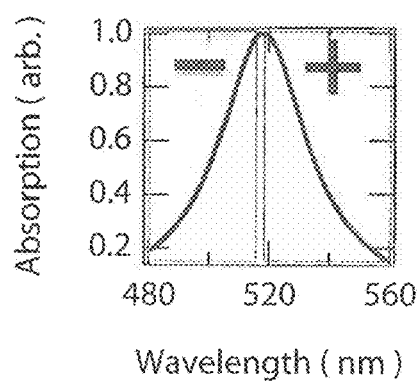
FIG. 19B is a plot of the absorption maximum of the Ag sphere of FIG. 19A.
Figure 19C:
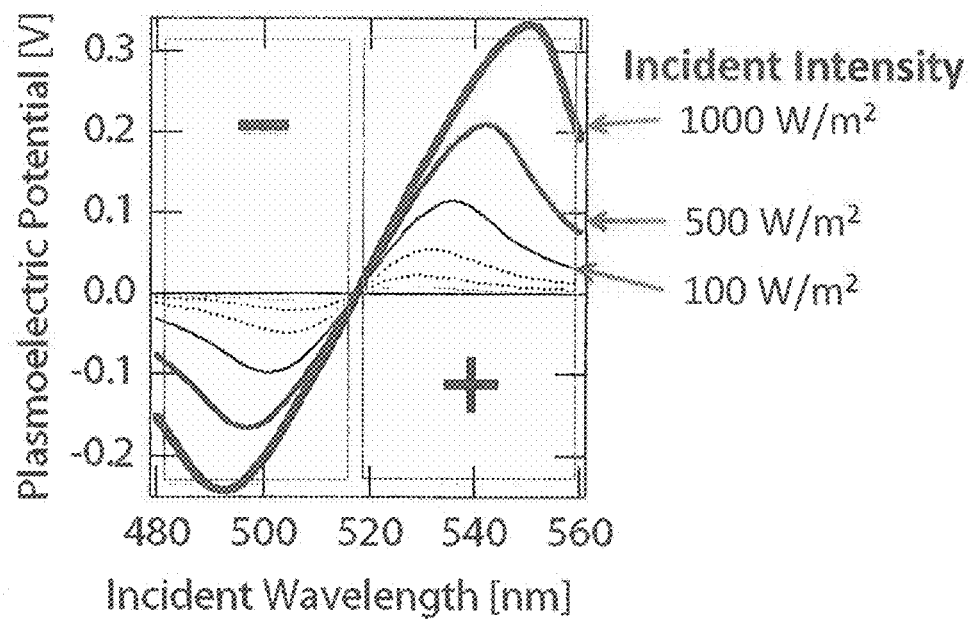
FIG. 19C is a plot of the plasmoelectric potential of the Ag sphere of FIG. 19A under different incident intensities.

The spectral and intensity dependence of the plasmoelectric potential may also be observed by electrical measurement as shown in FIG. 19A. In FIG. 19A, a 10 nm radius Ag sphere is irradiated with monochromatic light at a wavelength of 550 nm, and the induced potential is measured. FIG. 19B is a plot of the absorption maximum of the Ag sphere. FIG. 19C depicts the plasmoelectric potential under incident intensities of 1000 W $m^{-2}$, 500 W $m^{-2}$, and 100 W $m^{-2}$. As shown, the magnitude of the plasmoelectric potential depends on the intensity of the incident radiation. In addition, the sign of the plasmoelectric potential depends on the frequency: incident blue light at shorter wavelengths produces a negative potential and incident red light at longer wavelengths produces a positive potential.

Figure 20A:
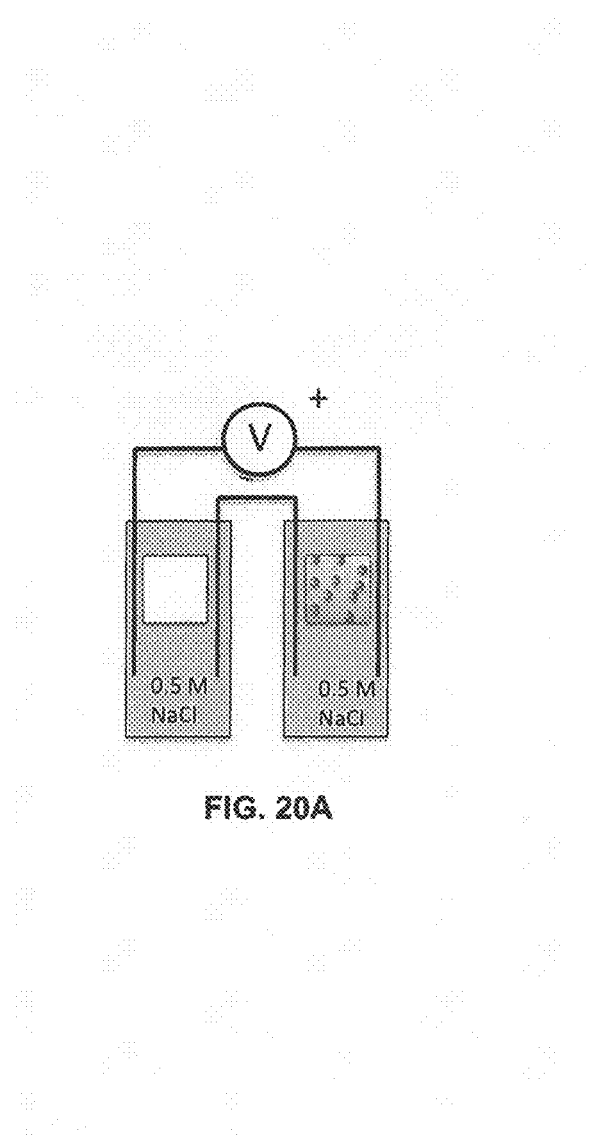
FIG. 20A is an illustration of an electrochemical cell in which 100 nm diameter Au particles were adsorbed in a cellulose/polyester matrix until stained.
Figure 20B:
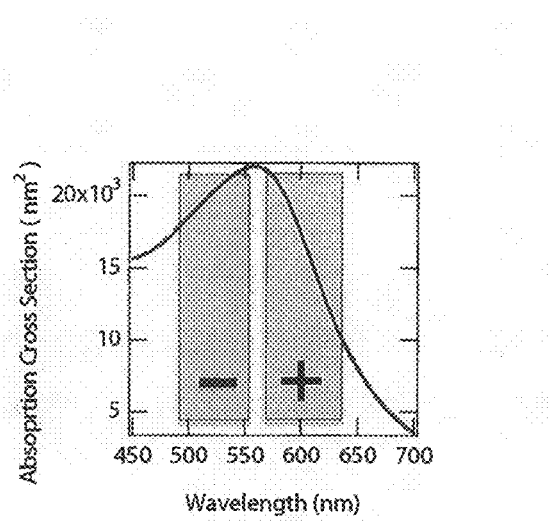
FIG. 20B is an absorption cross section plot of the Au particles in FIG. 20A.
Figure 20C:
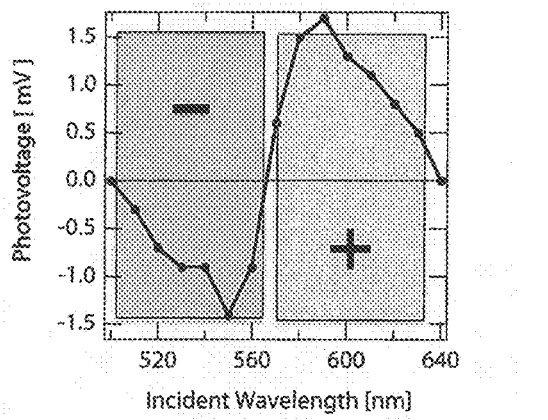
FIG. 20C is a plot of the photovoltage of the electrochemical cell in FIG. 20A.

The photovoltage of irradiated nanoparticles may also be measured using photoelectrochemical measurement. FIG. 20A is an electrochemical cell in which 100 nm diameter Au particles were adsorbed in a cellulose/polyester matrix until stained (right vial). The absorption cross section of the Au particles is shown in FIG. 20B. The Au particles in 0.5 M NaCl solution were irradiated using a scanned monochromatic light source and the measured photovoltage of the electrolyte solution was compared with a control sample (left vial) as a function of wavelength. Comparing the photovoltage plot of FIG. 20C with the absorption cross section of FIG. 20B, a sign change can be observed near the absorption maximum of the particles in the solution, at approximately 560 nm.

Figure 21A:
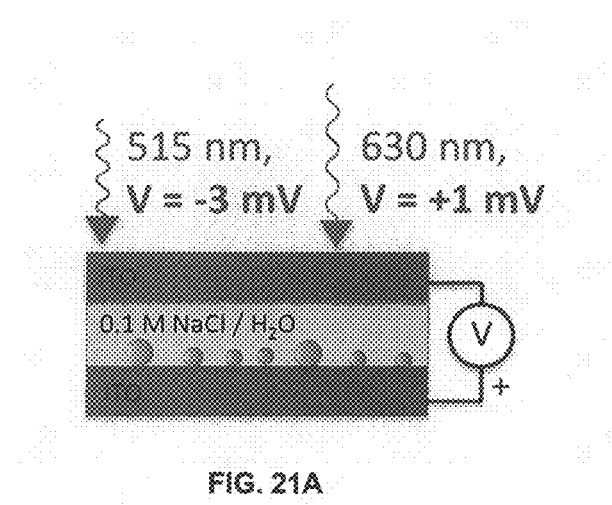
FIG. 21A is an illustration of 60 nm diameter Au particles spincast on an indium tin oxide (ITO) film and compared with a bare ITO film in a 0.1 M NaCl/H$_2$O electrolyte solution.
Figure 21B:
FIG. 21B is an intensity plot showing the ensemble spectrum of the 60 nm diameter Au particles of FIG. 21A.

FIG. 21A depicts another method of measuring the photovoltage of nanoparticles using an adaptation of the geometry of Dondapati, S. K., Ludemann, M., Mueller, R., Schwieger, S., Schwemer, A., Haendel, B., Kwiatkowski, D., et al., Voltage-Induced Adsorbate Damping of Single Gold Nanorod Plasmons in Aqueous Solution, *Nano Letters*, 12(3), 1247-1252. doi:10.1021/nl203673g (2012), the entire content of which is incorporated herein by reference. In the example shown in FIG. 21A, 60 nm diameter Au particles are spincast on ITO film and compared with a bare ITO film in a 0.1 M NaCl/$H_2O$ electrolyte solution. FIG. 21B is an intensity plot showing the ensemble spectrum of 60 nm diameter Au particles on ITO. When the solution is irradiated at a wavelength of 515 nm, a photovoltage of −3 mV is observed, and when the solution is irradiated at a wavelength of 630 nm, a photovoltage of +1 mV is observed. Thus, the sign of the measured photovoltage is consisted with the predicted behavior of the plasmoelectric effect, in which incident blue light at shorter wavelengths produces a negative potential and incident red light at longer wavelengths produces a positive potential. The low magnitude of the observed photovoltage is likely due to the very low optical density of the sample and the in-series resistance of the sample geometry.

Figure 22B:
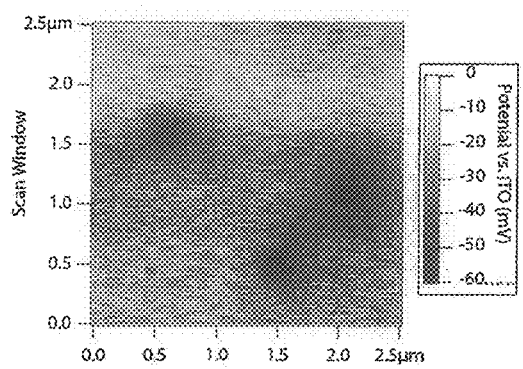
FIG. 22B is a KPFM surface map depicting three Au particles.
Figure 22A:
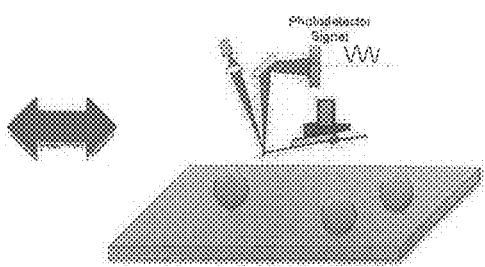
FIG. 22A depicts a method of measuring induced plasmoelectric potential by Kelvin Probe Force Microscopy (KPFM).
Figure 22C:
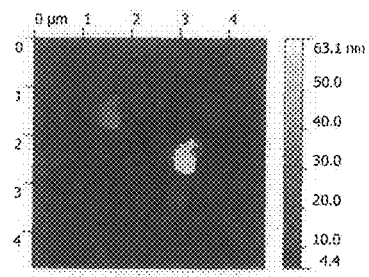
FIG. 22C is an atomic force microscopy (AFM) image of a local sample region.

The induced plasmoelectric potential may also be measured using KPFM, an AFM technique. As shown in FIG. 22A, KPFM uses a scanning probe to measure the work function difference between a conductive tip of the probe and a sample. The sample shown in FIG. 22A contains a 60 nm average diameter Au colloid on an ITO film. A generated nanoscale map of the surface potential is generated which shows the work function offset compared with the sample. For example, the KPFM surface map in FIG. 22B depicts three Au particles and shows the work function offset compared with the ITO film. FIG. 22C is an AFM image of a local sample region.

Figure 23A:
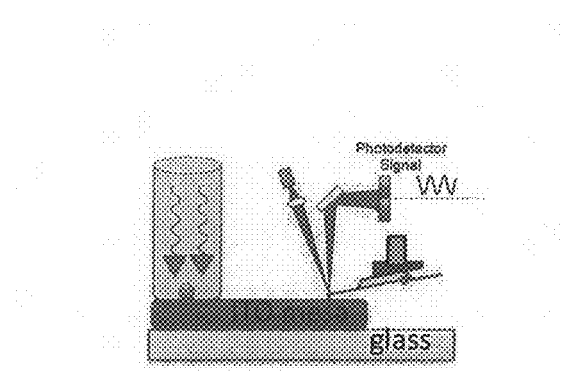
FIG. 23A depicts a method of measuring induced plasmoelectric potential by KPFM according to another approach.
Figure 23C:
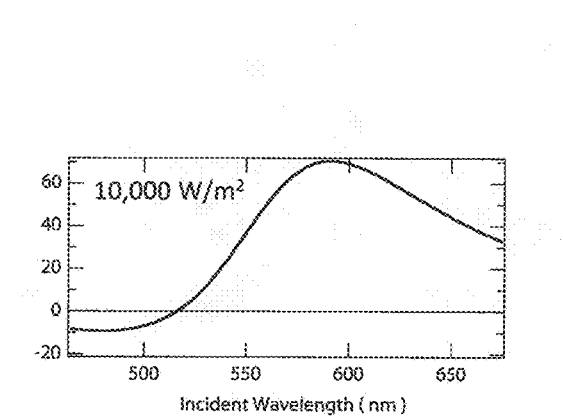
FIG. 23C is a plot of the theoretical plasmoelectric potential for the 60 nm diameter Au nanoparticle irradiated under an intensity of 10,000 W m$^{-2}$.
Figure 23B:
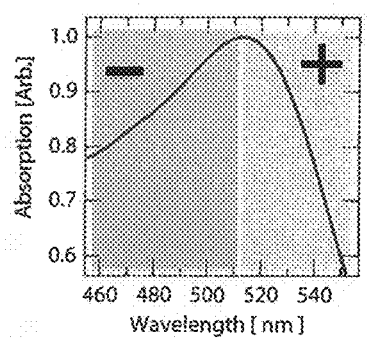
FIG. 23B is a plot of the absorption maximum of a 60 nm diameter Au nanoparticle on an ITO film.
Figure 23D:
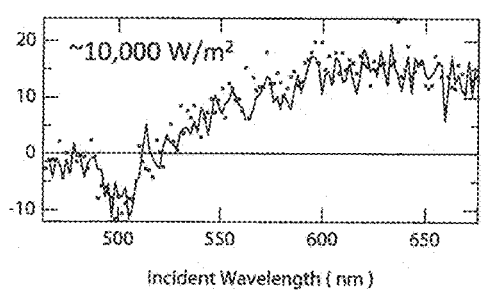
FIG. 23D is a plot of the experimental plasmoelectric potential for the 60 nm diameter Au nanoparticle irradiated with monochromatic light under an intensity of 10,000 W m$^{-2}$.

FIG. 23A shows an example of using KPFM to directly probe the plasmoelectric potential of a nanoparticle. As shown in FIG. 23A, the area containing a particle to be irradiated with light is separated from the KPFM conductive tip so that the surface potential of the ITO film is measured while the tip is kept dark. FIG. 23B is a plot of the absorption maximum of the particle, which is a 60 nm diameter Au nanoparticle on an ITO film. FIG. 23C is a plot of the theoretical plasmoelectric potential for the Au nanoparticle irradiated under an intensity of 10,000 W $m^{-2}$. FIG. 23D is a plot of the experimental plasmoelectric potential for the Au nanoparticle irradiated with monochromatic light under an intensity of approximately 10,000 W $m^{-2}$. As shown in FIG. 23D, the induced potential of a single particle changes sign with light on either side of the absorption maximum of FIG. 23B. As can be seen from FIGS. 23C and 23D, there is a clear shift of surface potential while scanning with monochromatic light. The observed sign change is consistent with the plasmoelectric effect.

Figure 23E:
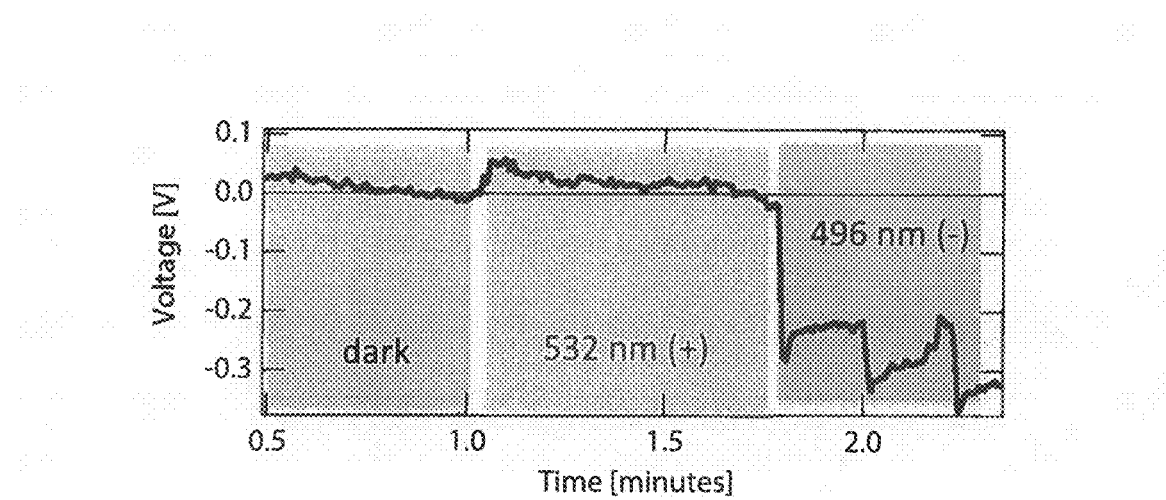
FIG. 23E is a voltage plot of a time study of the surface potential of an ITO substrate.
Figure 23F:
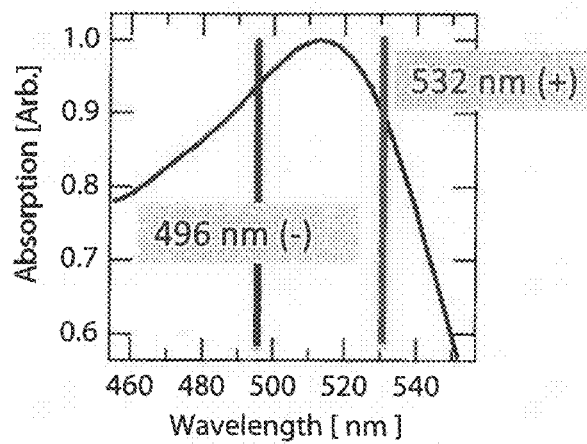
FIG. 23F is a plot of the calculated absorption maximum of the Au nanoparticle.

FIG. 23E is a voltage plot of a time study of the surface potential of an ITO substrate. During the time study, the conductive tip of the scanning probe is kept dark to avoid heating and photocarrier generation in the tip. The voltage plot shows a clear shift of the surface potential with changes in the incident color, from positive at an incident wavelength of 532 nm (red light) to negative at an incident wavelength of 496 nm (blue light). This sign change is consistent with the plasmoelectric effect. The calculated absorption maximum is shown in the plot of FIG. 23F.

Figure 24A:
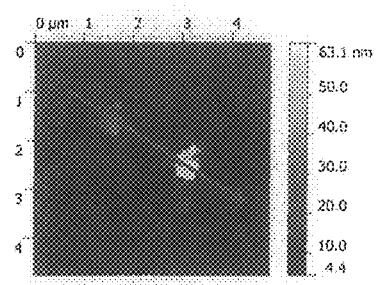
FIG. 24A is an AFM image of a local sample region.
Figure 24B:
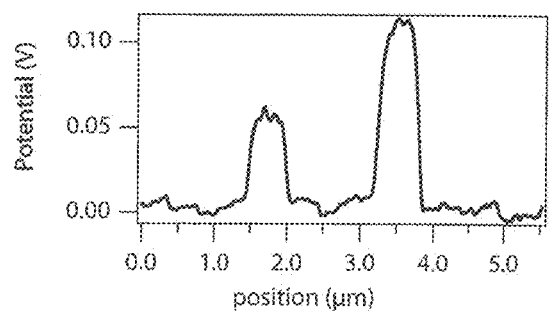
FIG. 24B is a plot of the measured potential of an Au particle.

FIGS. 24A and 24B depict the results of a dark study conducted near 60 nm diameter Au particles. FIG. 24A is an AFM image of a local sample region. FIG. 24B is a plot of the measured potential of the Au particles. The potential on the ITO is defined as zero and KPFM line scans over the Au particles (blue) resolve their potential offset with ITO. The dark study shows that the KPFM technique has resolution that can resolve the individual particles (i.e., the surface potential contrast between Au particles and ITO is resolved).

Figure 25A:
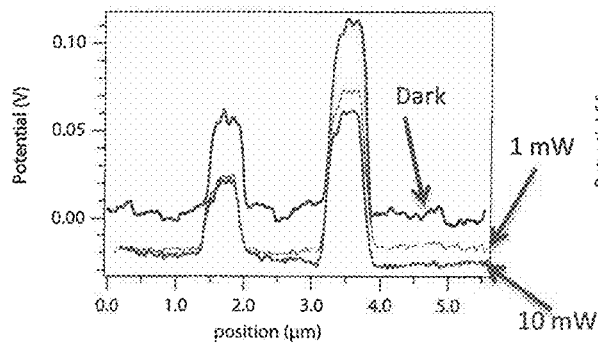
FIG. 25A is a plot of the measured potential of an Au particle as measured during a dark study compared with the measured potential of the particle irradiated at 514 nm during a light study under irradiation intensities of 1 mW and 10 mW.
Figure 25B:
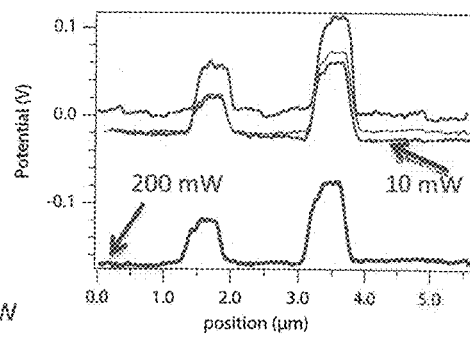
FIG. 25B is a plot of the measured potential of an Au particle as measured during a dark study compared with the measured potential of the particle irradiated at 514 nm during a light study under irradiation intensities of 10 mW and 200 mW.

FIGS. 25A and 25B depict the results of a light study conducted near a 60 nm diameter Au particle under incident radiation at a wavelength of 514 nm. The incident radiation profile, including the incident wavelength and the light intensity, affects the optimal particle size. A nanoparticle has an optimal size when it has resonance that is closer to the incident wavelength, based on variations in size. It is predicted that the plasmoelectric voltage will have a negative polarity and will scale with the light intensity. FIGS. 25A and 25B are plots of the measured potential of the particle as measured during the dark study ("Dark") compared with the measured potential of the particle irradiated at 514 nm during the light study under irradiation intensities of 1 mW, 10 mW, and 200 mW. With high light intensity, the entire surface region potential is lowered. For example, under an incident light intensity of 200 mW, the entire surface region potential is lowered by 170 mV as compared with the surface region potential under an incident light intensity of 10 mW.

Figures 26A, 26B, 26C, 26D:
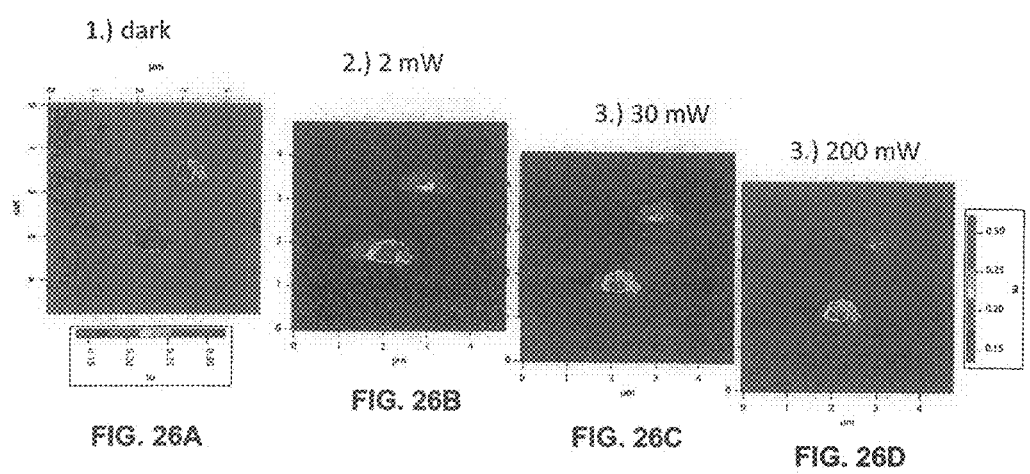
FIG. 26A is a KPFM surface potential map for 60 nm diameter Au particles irradiated at a wavelength of 532 nm in dark light.
FIG. 26B is a KPFM surface potential map for 60 nm diameter Au particles irradiated at a wavelength of 532 nm under an irradiation intensity of 2 mW.
FIG. 26C is a KPFM surface potential map for 60 nm diameter Au particles irradiated at a wavelength of 532 nm under an irradiation intensity of 30 mW.
FIG. 26D is a KPFM surface potential map for 60 nm diameter Au particles irradiated at a wavelength of 532 nm under an irradiation intensity of 200 mW.

FIGS. 26A through 26D present a full view of samples corresponding to line scans of a plasmoelectric device such as that shown in FIG. 2. FIG. 26A is a KPFM surface potential map for 60 nm diameter Au particles irradiated at a wavelength of 532 nm in dark light. FIGS. 26B through 26D are KPFM surface potential maps for 60 nm diameter Au particles irradiated at a wavelength of 532 nm under irradiation intensities of 2 mW, 30 mW and 200 mW, respectively.

Thus, experimental measurements of plasmoelectric phenomena are consistent with the model for the plasmoelectric effect, which predicts a shift of the electrochemical potential of a plasmonic resonator induced by off-resonant radiation (i.e., radiation at a frequency other than the resonance frequency). Moreover, the sign and magnitude dependence of the plasmoelectric potential, as demonstrated in the above experimental results, distinguishes the plasmoelectric effect from the thermoelectric effect and the photovoltaic effect.

As this invention has been described herein by way of exemplary embodiments, many modifications and variations will be apparent to those skilled in the art. Accordingly, it is to be understood that the invention described herein may be embodied other than as specifically described herein. For example, although the specific case of Ag nanospheres under irradiation at discrete wavelengths was considered, aspects of embodiments of the present invention can be extended to a variety of material systems, resonator geometries, and radiation environments.

Figure 27A:
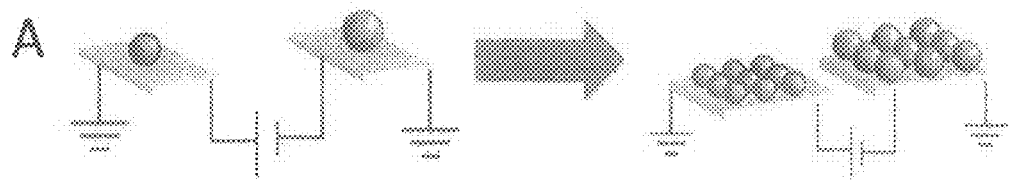
FIG. 27A is a device schematic of a plasmoelectric device according to an embodiment of the present invention. To the right of the arrow is a plasmoelectric device in an array configuration according to another embodiment.
Figure 27B:
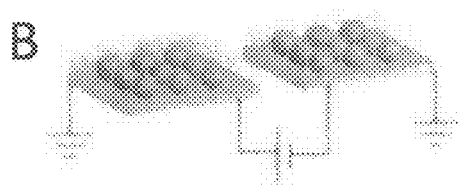
FIG. 27B is a device schematic of a plasmoelectric device having a varied dielectric environment.
Figure 27C:
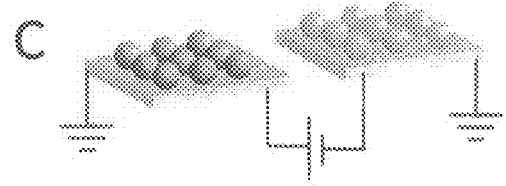
FIG. 27C is a device schematic of a plasmoelectric device having a varied particle composition.
Figure 27D:
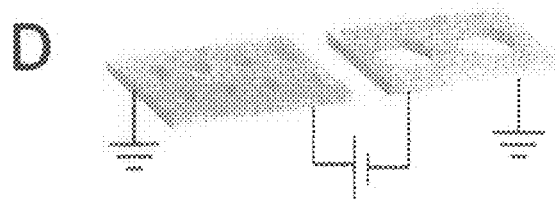
FIG. 27D is a device schematic of a plasmoelectric device having other geometric parameters.

FIGS. 27A through 27D depict several alternative device schemes that may be employed. For example, FIG. 27A shows a plasmoelectric device according to an embodiment on the left hand side, which assumes no optical coupling between separated spheres (e.g., no bonding or anti-bonding optical modes). However, as shown on the right hand side of FIG. 27A, the device could be an array. In addition, plasmoelectric devices according to embodiments of the present invention could vary the dielectric environment as shown in FIG. 27B, the particle composition as shown in FIG. 27C, or other geometric parameters as shown in FIG. 27D.

Further, while the plasmoelectric effect may be employed for optical power conversion or wireless power transfer as described herein, the phenomenon may also be used in other applications such as developing a new class of optoelectronic devices. For example, the plasmoelectric effect may modulate the absorption cross section at specific frequencies for applications relating to optical switching. With an appropriate circuit design, a plasmoelectric device for broadband power conversion like that in FIG. 2 could produce an electrical signal that is characteristic of the incident spectrum, enabling subwavelength spectrometers with electronic readout.

According to other aspects of embodiments of the present invention, the plasmoelectric effect permits active control of the Fermi level of a metal using incident radiation. As such, new types of all-metal optoelectronic devices may be developed by replacing the usual function of doped or gated semiconductor components with metal nanostructures that are optically excited off-resonance, an approach that is facilitated by the spectral tailorability of plasmonic nanostructures.

While the present invention has been illustrated and described with reference to certain exemplary embodiments, those of ordinary skill in the art will understand that various modifications and changes may be made to the described embodiments without departing from the spirit and scope of the present invention, as defined in the following claims.

What is claimed is:

1. A plasmoelectric device for conversion of optical power to direct current (DC) electrical power, comprising:
a first plasmonic nanostructure comprising a first nanoparticle having a first resonance value;
a second plasmonic nanostructure comprising a second nanoparticle having a second resonance value different from the first resonance value, the first and second plasmonic nanostructures being electrically coupled;
circuitry adapted to carry transferred charge to an external load, and
an optical structure configured to transmit irradiation from an optical light source such that only selected frequencies from the optical light source are incident on the first and second plasmonic nanostructures wherein the selected frequencies correspond to an irradiation value between the first and second resonance values,
wherein the first and second plasmonic nanostructures are configured to induce charge transfer between the first and second plasmonic nanostructures when irradiated at the irradiation value between the first and second resonance values.

2. The plasmoelectric device of claim 1, wherein the first and second nanoparticles have different sizes.

3. The plasmoelectric device of claim 1, wherein the first plasmonic nanostructure is surrounded by a first dielectric matrix material and the second plasmonic nanostructure is surrounded by a second dielectric matrix material different from the first dielectric matrix material.

4. The plasmoelectric device of claim 1, further comprising circuitry adapted to electrically couple the first and second plasmonic nanostructures.

5. The plasmoelectric device of claim 4, wherein the device is implemented as an all-metal circuit.

6. An all-conductor power conversion device comprising:
a first plasmonic nanostructure comprising a first nanoparticle having a first internal charge density corresponding to a first resonance value;
a second plasmonic nanostructure comprising a second nanoparticle having a second internal charge density corresponding to a second resonance value different from the first resonance value, the first and second plasmonic nanostructures being electrically coupled;
circuitry adapted to carry transferred charge to an external load, and
an optical structure configured to transmit irradiation from an optical source to the first and second plasmonic nanostructures predominantly at an irradiation value outside a range defined by the first and second resonance values,
wherein the first and second plasmonic nanostructures are configured to change the first and second internal charge densities and to induce charge transfer between the first and second plasmonic nanostructures when irradiated at the irradiation value outside the range defined by the first and second resonance values.

7. The all-conductor power conversion device of claim 6, wherein the optical structure is configured to transmit the irradiation to the first and second plasmonic nanostructures to decrease the first internal charge density and increase the second internal charge density.

8. The all-conductor power conversion device of claim 6, further comprising a conduction element configured to electrically couple the first and second plasmonic nanostructures to permit movement of charge from the first plasmonic nanostructure to the second plasmonic nanostructure.

9. A plasmoelectric device for conversion of optical power to direct current (DC) electrical power, comprising:
a first plasmonic nanostructure comprising a first nanoparticle having one internal charge density corresponding to a first resonance value, and at least another internal charge density when exposed to irradiation;
a second plasmonic nanostructure comprising a second nanoparticle having one internal charge density corresponding to a second resonance value, and at least another internal charge density when exposed to irradiation, the first and second plasmonic nanostructures being electrically coupled;
a conductive element electrically coupling the first plasmonic nanostructure and the second plasmonic nanostructure to the circuitry and adapted to carry transferred charge to an external load, and
an optical structure configured to transmit irradiation from an optical source to the first and second plasmonic nanostructures predominantly at an irradiation value outside the first and second resonance values,
wherein at least one of the plasmonic nanostructures is configured to alter from the one internal charge density to the at least another internal charge density, and to induce charge transfer between the at least one of the plasmonic nanostructures and the other plasmonic nanostructure when irradiated at the irradiation value outside the first and second resonance values.

10. A plasmoelectric device for conversion of optical power to direct current (DC) electrical power, comprising:
a first plasmonic nanostructure comprising a first nanoparticle having a first material and having a first resonance value, wherein the first plasmonic nanostructure is without an insulative component;
a second plasmonic nanostructure comprising a second nanoparticle having a second material different from the first material and having a second resonance value;
a conduction element adapted to electrically couple the first and second plasmonic nanostructures; and
at least one optical structure configured to transmit irradiation from an optical light source such that only selected frequencies from the optical light source are incident on the first and second plasmonic nanostructures, wherein the selected frequencies incident on the first plasmonic nanostructure correspond to a first irradiation value and the selected frequencies incident on the second plasmonic nanostructure correspond to a second irradiation value predominantly different from the first irradiation value,
wherein the first and second plasmonic nanostructures are adapted to transfer charge via the conduction element when the first plasmonic nanostructure is irradiated at the first irradiation value and the second plasmonic nanostructure is irradiated at the second irradiation value different from the first irradiation value.

11. The plasmoelectric device of claim 1, further comprising a conduction element configured to electrically couple the first plasmonic nanostructure and the second plasmonic nanostructure to the circuitry.

12. The plasmoelectric device of claim 11, wherein the conduction element is a wire.

13. The all-conductor power conversion device of claim 6, further comprising a conduction element configured to electrically couple the first plasmonic nanostructure and the second plasmonic nanostructure to the circuitry.

14. The all-conductor power conversion device of claim 13, wherein the conduction element is a wire.

15. The plasmoelectric device of claim 9, wherein the conductive element electrically coupling the first plasmonic nanostructure and the second plasmonic nanostructure to the circuitry is a wire.

16. The plasmoelectric device of claim 10, further comprising circuitry adapted to carry transferred charge to an external load and a conduction element electrically coupling the first plasmonic nanostructure and the second plasmonic nanostructure to the circuitry to the circuitry.

* * * * *